(12) United States Patent
Bhatta et al.

(10) Patent No.: US 10,095,052 B2
(45) Date of Patent: *Oct. 9, 2018

(54) ELECTRONICALLY SWITCHABLE OPTICAL DEVICE WITH A MULTI-FUNCTIONAL OPTICAL CONTROL APPARATUS AND METHODS FOR OPERATING THE SAME

(71) Applicant: ALPHAMICRON INCORPORATED, Kent, OH (US)

(72) Inventors: Sandip Bhatta, Kent, OH (US); Pedro Coutino Soto, Kent, OH (US); Tamas Kosa, Hudson, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/230,641

(22) Filed: Aug. 8, 2016

(65) Prior Publication Data

US 2017/0068112 A1 Mar. 9, 2017

Related U.S. Application Data

(63) Continuation-in-part of application No. 13/639,523, filed as application No. PCT/US2011/031181 on Apr. 5, 2011, now Pat. No. 9,411,174.

(Continued)

(51) Int. Cl.
*G02C 7/10* (2006.01)
*G02F 1/133* (2006.01)
*G02F 1/1333* (2006.01)

(52) U.S. Cl.
CPC ......... *G02C 7/101* (2013.01); *G02C 2202/16* (2013.01); *G02F 1/13318* (2013.01); *G02F 1/13338* (2013.01)

(58) Field of Classification Search
CPC . G09G 3/18; G09G 3/19; G02C 7/101; G02F 1/13318; G02F 1/13338; G02F 1/163; B60R 1/088
(Continued)

(56) References Cited

U.S. PATENT DOCUMENTS 3,109,132 A 10/1963 Witte
3,829,332 A 4/1974 Lizuka et al.
(Continued)

FOREIGN PATENT DOCUMENTS

JP 1986-304961 12/1986 ............... G02C 7/10
JP 63157128 6/1988 ............... G02C 7/10
(Continued)

OTHER PUBLICATIONS

International Search Report dated Jul. 1, 2011 in related application PCT/US2011/031181.
(Continued)

*Primary Examiner* — Que T Le
(74) *Attorney, Agent, or Firm* — Renner Kenner Greive Bobak Taylor & Weber

(57) ABSTRACT

An electronically controllable eyewear device having a cell filled with a liquid crystal material that can be electronically operated in an auto or a manual mode. The device contains a photosensor for generating a light input signal to trigger an automatic application of voltage to the cell when the device is in an auto mode, one or more switches capable of being actuated in a series of actuation sequences each to select a distinct function, and a control circuit responsive to each actuation sequence and light input signal to operate the cell in a corresponding one of a plurality of functions, including: (i) a first sequence for affecting an ON/OFF function, (ii) a second sequence for affecting a system change from the manual mode to the auto mode, and (iii) a third sequence for
(Continued)

changing the threshold value for triggering the automatic application of voltage.

31 Claims, 19 Drawing Sheets

Related U.S. Application Data

(60) Provisional application No. 61/320,920, filed on Apr. 5, 2010.

(58) Field of Classification Search
USPC .................................. 250/214 AI, 214 R, 216
See application file for complete search history.

(56) References Cited

U.S. PATENT DOCUMENTS

| | | | |
|---|---|---|---|
| 4,084,123 A | 4/1978 | Lineback et al. ................. | 320/2 |
| 4,191,917 A | 3/1980 | Brown et al. ..................... | 320/2 |
| 4,279,474 A | 7/1981 | Belgorod .................. | 350/331 R |
| 4,300,818 A | 11/1981 | Schachar .......................... | 351/7 |
| 4,415,843 A | 11/1983 | Feldman ....................... | 318/139 |
| 4,416,595 A | 11/1983 | Cromie .......................... | 417/476 |
| 4,508,105 A | 4/1985 | Whitten et al. ............... | 128/1 C |
| 4,690,508 A * | 9/1987 | Jacob ................... | G02F 1/1313 349/116 |
| 4,804,949 A | 2/1989 | Faulkerson ................... | 340/710 |
| 5,015,086 A | 5/1991 | Okaue et al. ................... | 351/44 |
| 5,067,795 A * | 11/1991 | Senatore ................ | A61F 9/067 349/116 |
| 5,081,542 A | 1/1992 | Efron et al. ..................... | 359/41 |
| 5,114,218 A | 5/1992 | Black et al. .................... | 351/44 |
| 5,260,636 A | 11/1993 | Leiserson et al. ................ | 320/2 |
| 5,276,539 A | 1/1994 | Humphrey ..................... | 359/40 |
| 5,583,744 A | 12/1996 | Oguchi et al. ................ | 361/683 |
| 6,007,939 A | 12/1999 | Clowers .......................... | 429/99 |
| 6,117,576 A | 9/2000 | Sugai ................................ | 429/7 |
| 6,495,987 B2 | 12/2002 | Kuo et al. ..................... | 320/107 |
| 7,355,161 B2 | 4/2008 | Romig et al. ................. | 250/221 |
| 7,425,066 B2 | 9/2008 | Blum et al. ................... | 351/159 |
| 7,874,666 B2 * | 1/2011 | Xu .......................... | G02C 7/101 2/15 |
| 9,411,174 B2 * | 8/2016 | Burt ....................... | G02C 7/101 |
| 2008/0013000 A1 | 1/2008 | Park et al. ....................... | 349/13 |
| 2008/0239452 A1 | 10/2008 | Xu et al. ....................... | 359/265 |

FOREIGN PATENT DOCUMENTS

| | | | | |
|---|---|---|---|---|
| WO | WO 92/10130 | | 6/1992 | ............... G02C 7/10 |
| WO | WO 2008/118967 A1 | | 10/2008 | ............... G02C 5/00 |

OTHER PUBLICATIONS

Written Opinion dated Jul. 1, 2011 in related application PCT/US2011/031181.
European Search Report dated May 13, 2016 in related application 11 719 087.6.
Office Action dated Jun. 3, 2014 in related U.S. Appl. No. 13/639,523.
Response to OA dated Jun. 3, 2014 as filed Oct. 3, 2014 in related U.S. Appl. No. 13/639,523.
Final Office Action dated Feb. 4, 2015 in related U.S. Appl. No. 13/639,523.
Response to FOA dated Feb. 4, 2015 as filed Jun. 4, 2015 in related U.S. Appl. No. 13/639,523.
Office Action dated Sep. 15, 2015 in related U.S. Appl. No. 13/639,523.
Response to OA dated Sep. 15, 2015 as filed Dec. 15, 2015 in related U.S. Appl. No. 13/639,523.
Supplemental Response to OA dated Sep. 15, 2015 as filed Mar. 11, 2016 in related U.S. Appl. No. 13/639,523.
Notice of Allowance dated Apr. 8, 2016 in related U.S. Appl. No. 13/639,523.

* cited by examiner

Fig.6A

| SUB_CELL 1 | SUB_CELL 2 | RESULTANT COLOR |
|---|---|---|
| CLEAR | CLEAR | CLEAR |
| CLEAR | BLUE | BLUE |
| AMBER | CLEAR | AMBER |
| AMBER | BLUE | GREY/NEUTRAL |

Fig. 6B

| SUB_CELL 1 | SUB_CELL 2 | RESULTANT COLOR |
|---|---|---|
| CLEAR | CLEAR | CLEAR |
| CLEAR | COLOR 2 | COLOR 2 |
| COLOR 1 | CLEAR | COLOR 1 |
| COLOR 1 | COLOR 2 | COLOR 1 + COLOR 2 |

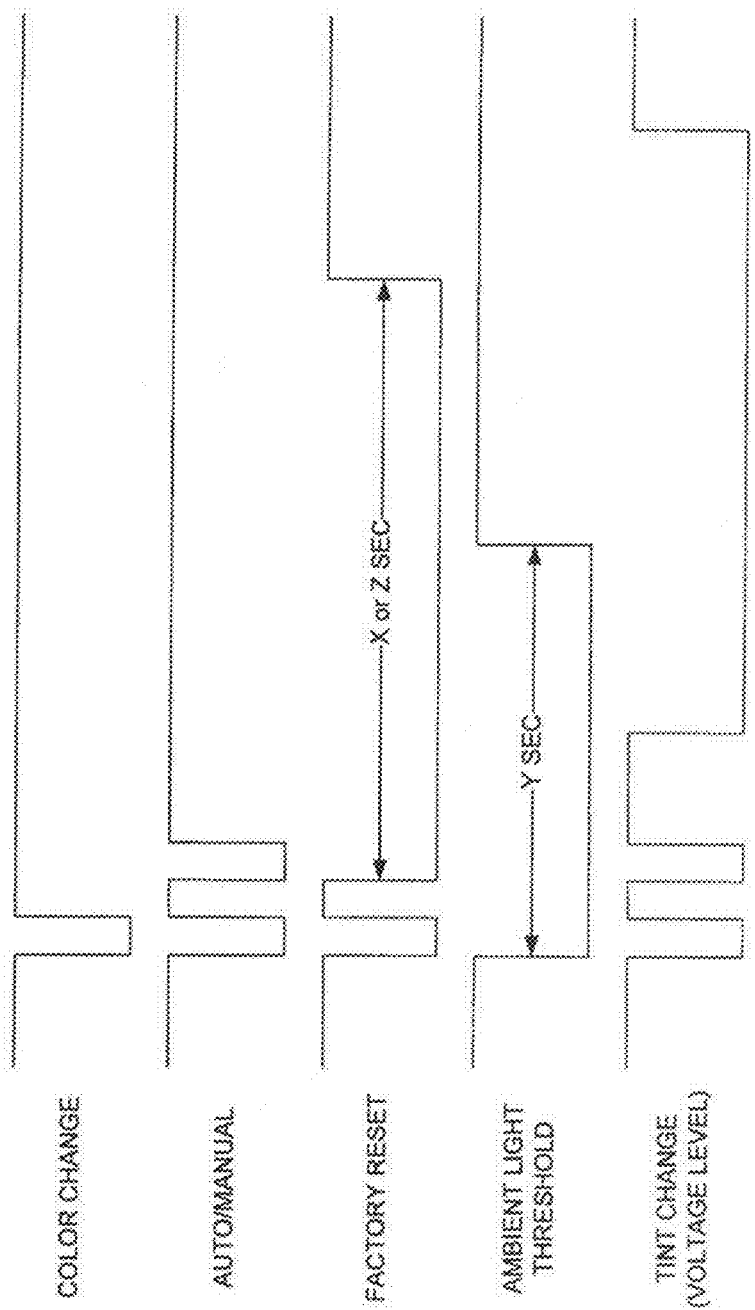

ELECTRONICALLY SWITCHABLE OPTICAL DEVICE WITH A MULTI-FUNCTIONAL OPTICAL CONTROL APPARATUS AND METHODS FOR OPERATING THE SAME

RELATED APPLICATIONS

This application is a Continuation-In-Part application of application Ser. No. 13/639,523, filed Nov. 8, 2012, which is a 371 application of International Application No. PCT/US2011/031181 filed Apr. 5, 2011, which claims priority of U.S. Provisional Application No. 61/320,920, filed Apr. 5, 2010, the entire contents of all of which are incorporated herein by reference.

TECHNICAL FIELD

The present invention is directed to an electronically controllable optical device incorporating a multi-functional control apparatus and methods for operating said optical device.

BACKGROUND ART

Electro-optic materials exhibit optical properties that can be altered by application of an electric field, current, or other electromagnetic fields. The most common of these materials are liquid crystals, electrochromic, and Kerr materials. Changes in the absorption properties of these materials can be utilized to make electronically controllable devices such as electronically controllable eyewear, goggles, visors, and welding masks. An example of these devices are the e-Tint® based ski goggles sold by UVEX® or autodimming filters sold for welding helmets. In the ski goggle product, a switch is used to change the state of the system from clear (unenergized state) to dark (energized state) and vice versa. Welding helmets use a photosensitive cell, such as a photodiode, photoresistor, solar cell, etc. (collectively named photosensor), which causes application of a voltage to the device when there is sufficient light from the welding arc to activate the device and induce a state change in the material. Once the arc is off, the device returns to the unenergized state. Therefore, currently, to our knowledge, there are commercial systems that provide either manual or automatic control of the optical device but not both within the same device.

One desired feature of electronically controllable optical devices is to give the user of such devices control over many functions in a simple fashion while the user is still "wearing" the device. For example, it is desirable to give the operator the ability to change the state of the device from clear to dark (or colored) as well as the ability to change other features of the device, e.g. the ability to switch between manual and automatic modes. Other operational modes can also be controlled, such as: the ability during the automatic operation mode to set the level of light that can cause a state change (i.e. the sensitivity of the photosensor to the ambient light level), the ability to change the color if the device has multiple color modes, the ability to adjust the "darkness" level of the device, and/or the ability to return the system to its original factory setting.

Therefore, there is a need in the art for an electronically controllable optical device that has a control apparatus that can provide multiple-function control over the optical device either in a "blind" fashion (without the need for the operator to see which switch they are activating) or remotely (e.g. via a remote switch that the user can more freely access).

SUMMARY OF THE INVENTION

One way to achieve this, as described below, is to create a system in which a single switch is coded to provide multiple functions needed. A further solution is to have two switches, one on either side of the eyewear, performing identical, overlapping or complementary functions. Other solutions include having a remote switch as well as one or more switches in the device itself to allow a user to incorporate and control additional functions.

Disclosed herein are electronically controllable optical devices that include a cell maintaining an electro-optically controllable material; a photosensor associated with the cell, wherein the photosensor generates an input signal based on the ambient light level; a control circuit receiving the input signal and generating at least one output signal received by the cell; and one or more switches connected to the control circuit. Actuation of the switch (or switches) in a series of predetermined sequences enables various functions of the optical device.

In one embodiment, the functions include at least two selected from the following: (i) a state change of the electro-optically controllable material (On/Off function); (ii) a system change between an Auto mode and a Manual mode; (iii) a change in the threshold value for generation of the input signal when in the auto mode; and/or (iv) a reset of the threshold value back to a factory setting.

In some embodiments, actuation of a single switch enables at least two, or three, or all four functions selected from functions (i) to (iv) recited above.

In another embodiment, actuation of one of two switches enables one or more of the functions selected from functions (i) to (iv) recited above.

Accordingly, contemplated herein is an electronically controllable eyewear device having a cell that includes at least one liquid crystal material able to change between a first state of maximum light transmittance (Tmax) when no voltage (V0) is applied and a second state of minimum light transmittance (Tmin) when a maximum voltage (Vmax) is applied. The cell can be operated in an auto or a manual mode. The device further includes a photosensor electronically connected to the cell for generating a light input signal based on the ambient light level to automatically apply voltage (i.e. trigger an automatic application of voltage) when the device is in the auto mode, such that detection of an ambient light level above a predetermined threshold value triggers the automatic application of voltage to the cell, and detection of an ambient light level below the threshold value results in no voltage (V0) being applied.

In one embodiment, the device includes a first and a second switch, each capable of being actuated in a series of actuation sequences such that each actuation sequence selects a distinct function; and a control circuit responsive to each actuation sequence and light input signal to operate the cell in a corresponding one of a plurality of functions. The actuation sequences include: (i) a first sequence for affecting an ON/OFF function such that when OFF, no voltage is applied to the cell and when ON, a voltage is applied to the cell; (ii) a second sequence for affecting a system change from the manual mode to the auto mode; and (iii) a third sequence for changing the threshold value for triggering the automatic application of voltage.

In some embodiments, actuating the first or second switch using the third actuation sequence when the device is in the auto mode and in a selected ambient light condition changes the threshold value for triggering the automatic application of voltage to the specific selected ambient light condition.

In some embodiments, if the threshold value for triggering the automatic application of voltage has been changed, actuating the first or second switch in a Factory Re-set sequence (e.g. fourth sequence) affects a factory re-set to the original factory settings (e.g. default threshold value).

In some examples, a further actuation sequence affects a manual increase or decrease in the threshold value for triggering the automatic application of voltage.

In some examples, when the device is in the auto mode, actuating the first or second switch using an actuation sequence (e.g. the first actuation sequence) returns the device from the auto mode to the manual mode.

In some examples, the first and second switch perform the same functions when actuated in each of the same predetermined actuation sequence. Thus, the actuations sequences affecting some of the functions, e.g. functions (i), (ii) and (iii), are the same for the first and the second switch.

In other examples, actuating the first switch enables certain functions and actuating the second switch enables other functions—with or without overlap in actuation-function sequences. Where the device has two switches, they may both be attached (situated) on the device, or in some examples, one may be attached to the device and the other switch may be remote. It is also possible to have two switches or more on the device and a further remote switch. The remote switch may be able to perform the same function as the attached switches, or a number of additional functions or user commands.

Also contemplated herein are devices where the liquid crystal material is further able to change to one or more intermediate states having one or more intermediate light transmittance (Tn) between Tmax and Tmin when one or more intermediate voltages (Vn) are applied. In this embodiment, the actuation of the first or second switch, or both, in a new sequence toggles the applied voltage between one or more intermediate voltages (Vn) and the maximum voltage (Vmax) to alter the level of light transmission of the device. The toggling function may also include toggling between V0, one or more Vn and Vmax.

Also contemplated are devices where the cell includes at least two sub-cells, each sub-cell having at least one liquid crystal material able to change between the Tmax and Tmin states; and where actuation of the first switch or the second switch, or both, using the aforementioned actuation sequences selects a function for each sub-cell. For example, the first switch operates one or more functions in one sub-cell and the second switch operates one or more functions in the other sub-cell. There might also be some overlap between the two switches, where actuating either switch affects the same function (for one or both sub-cells or the device as a whole).

In one example, the first actuation sequence for affecting the ON/OFF function operates such that when actuated, each said sub-cell toggles between an OFF state where no voltage is applied to the sub-cell, and an ON state where a voltage is applied to the sub-cell, thereby toggling between four states: (i) both sub-cells Off, (ii) one sub-cell On, (iii) the other sub-cell On, and (iv) both sub-cells On.

In any of the two switch devices described herein, where the device has a first and a second temple, the first switch may be located on the first temple and the second switch located on the second temple. Alternatively, the two switches may be located on the same temple. One or more of the switches may be remotely located.

Also contemplated herein is an electronically controllable eyewear device as described above, having a cell with at least one liquid crystal material able to change transmission between Tmax and Tmin and one or more intermediate states Tn, where the cell can be operated in an auto or a manual mode, having a photosensor for generating a light input signal based on an ambient light level to trigger an automatic application of voltage; a switch; and a control circuit responsive to each of the switch actuation sequences and the light input signal to operate the cell in a corresponding one of a plurality of functions; where switch actuation sequences include: (i) a first actuation sequence for affecting an ON/OFF function such that when OFF, no voltage is applied to the cell and when ON, a voltage is applied to the cell; and (ii) a second actuation sequence for affecting a system change from the manual mode to the auto mode.

In some embodiments, actuating the switch using a third actuation sequence when the device is in the auto mode changes the threshold value for triggering the automatic application of voltage.

In some examples, a further actuation sequence can affect (enable) a manual increase or decrease in the threshold value for triggering the automatic application of voltage.

Another actuation sequence can enable a tint increase or decrease, where the tint is increased when the voltage applied is increased (going through the Tn states all the way to Tmin—where tint is maximum), and tint is decreased where the applied voltage is decreased (going through from Tmin to the Tn states). As shall be noted, increasing tint decreases transmission and vice versa. In some examples, tint can be decreased all the way to "clear" or Tmax.

In some examples, the above device has more than one switch, actuable in any predetermined sequence to affect one or more functions, which may be identical for each switch or may be different functions depending on which switch is actuated.

For example, actuating the first switch in a tint sequence can increase the voltage being applied and actuating the second switch in the tint sequence can decrease the voltage being applied, or vice versa.

In some embodiments, where the cell includes at least two stacked sub-cells, actuation of the switch (or switches) selects a distinct function for each or both said sub-cells. Thus some functions are sub-cell specific and some functions are aebled for both sub-cells or the device as a whole. For example, the first actuation sequence for affecting an ON/OFF function is such that when OFF, no voltage is applied to either sub-cell and when ON, a voltage is applied to one or more sub-cells. In some examples, the actuation sequences include: (ii) a second actuation sequence for affecting a system change for one or more (or both) sub-cells from the manual mode to the auto mode and vice versa; and (iii) a third actuation sequence for changing the threshold value for one or more (or both) said sub-cells when the device is in the auto mode. Other sequences include an actuation sequence for changing the threshold value for each sub-cell when the sub-cell is in the auto mode. In such devices, the control circuit may be capable of toggling the applied voltage to each sub-cell between the one or more intermediate voltages (Vn) and the maximum voltage to alter the level of light transmission of the sub-cell.

Any of the devices described above can further include a remote switch that is capable of producing one or more remote signals to enable one or more user commands. In such a device, the control circuit is responsive to each actuation sequence and light input signal to operate the cell in a corresponding one of a plurality of functions. The control circuit is further programmed to receive each remote signal and produce appropriate instructions to carry out the one or more user commands.

In some embodiments, the remote switch communicates with the eyewear device through a wireless connection.

In some examples, the remote switch is carried on or integrated into a smart device. For example, a smart device can include a software application providing a graphical interface with a predetermined set of labeled buttons corresponding to the user commands, where selection of each labeled button generates the appropriate remote signal.

The user commands can include one or more of the following: an ON/OFF function such that when OFF, no voltage is applied to the cell and when ON, a voltage is applied to the cell; a system change from the manual mode to the auto mode; and a threshold adjustment function for adjusting the threshold value for triggering the automatic application of voltage.

In some examples, where the liquid crystal material is further able to change to one or more intermediate states, the remote switch may be capable of enabling a user command to select one or more intermediate voltages $V_n$ to be applied to the cell to alter the level of light transmission of the device.

In some examples, where the cell includes at least two stacked sub-cells, the remote switch may be capable of producing one or more remote signals to enable one or more user commands for each sub-cell. In such a device, the control circuit is programmed to receive and process the remote signals for each sub-cell and produce appropriate instructions to carry out the user command for the appropriate sub-cell.

In each of the embodiments where the device includes a remote switch, the remote switch may be integrated into a program that can perform additional functions, or that can provide feedback to the user regarding the status of the eyewear, e.g. the level of tint, the threshold value, the ambient light level, the battery charge level, etc.

The devices described above may also have the following additional features:

In some embodiments, the device cell is made up of at least two sub-cells, wherein each sub-cell has a clear state and a color state. In such a device, actuation of the switch in another predetermined sequence enables a device color change. The device color change is achieved by changing the state of each sub-cell from its clear state to its color state. In one example, where the device has at least two sub-cells, the device color change includes changing the device color between at least a first color, a second color and a third color. So the color change sequence toggles between a first color where the first sub-cell is in a color state and the second sub-cell is clear, a second color where the first sub-cell is clear and the second sub-cell is in a color state, and a third color where both the first and second sub-cells are in a color state.

In a device with at least two sub-cells, actuation of the switch in yet another predetermined sequence can achieve a device tint change. The device tint change includes changing a voltage supplied to at least one of the sub-cells (when the sub-cell is activated) so as to change a darkness level of the sub-cell when the sub-cell is in a color state.

In some embodiments, the switch is movable from an open condition to a closed condition such that the switch is biased to return to the open condition.

Any predetermined sequence can be chosen for operation of the switch to enable any one or more of the functions recited above.

In one embodiment, actuation of the switch in a series of predetermined sequences enables the following operational features: (i) a state change of the electro-optically controllable material; (ii) a system change between an auto mode and a manual mode; (iii) a device color change; (iv) a change in the threshold value for generation of the input signal when in the auto mode; and (v) a reset of the threshold value to a factory setting.

Also described herein is a method of controlling an electronically switchable optical device. The method includes providing a cell with an electro-optically active material, a photosensor associated with the cell that can generate an ambient light input signal based on a threshold ambient light level, a control circuit that receives the ambient light input signal, and a switch connected to the control circuit. The method continues by actuating the switch in a predetermined sequence to enable two or functions selected from: (i) a state change of the electro-optically active material; (ii) a system change between an auto mode and a manual mode; (iii) a change in the threshold ambient light level for generation of the ambient light input signal when in the auto mode; or (iv) a reset of the threshold ambient light level for the generation of the ambient light input signal to a factory setting.

In one embodiment, the method includes pressing and releasing the switch in a first predetermined period of time to obtain a first operational feature; pressing and releasing the switch twice within a second predetermined period of time to obtain a second operational feature; and pressing and holding the switch for a third period of time to obtain a third operational feature.

In some embodiments, the method also allows for pressing and releasing the switch and then pressing and holding the switch within another predetermined period of time and holding the switch for yet another period of time to obtain a fourth operational feature.

The control circuit may associate any one of the above operational features with a state change of the electro-optically controllable material, a system change between an auto mode and a manual mode, a threshold value change for generation of the ambient light input signal, and a reset of the threshold value for generation of the ambient light input signal to a factory setting.

In some embodiments, the cell is provided with at least two sub-cells, each sub-cell having a clear state and a color state. The method allows for changing of the state of the electronically controllable material of any one of the sub-cells from any one of the clear and color states to any one of the other clear and color states. Accordingly, the method provides for actuating the single switch in another predetermined sequence to change each sub-cell between its clear state and its color state to obtain a device color change. In some embodiments, the device color change comprises changing the device color between at least a first color, a second color and a third color.

In some embodiments, the method associates by the control circuit one of the operational features with resetting the threshold value and changing the state of the electro-optically controllable material while either in the auto mode or the manual mode.

In one embodiment, the method provides for actuating the switch in a series of predetermined sequences to enable the following functions: (i) a state change of the electro-optically controllable material; (ii) a system change between an auto mode and a manual mode; (iii) a device color change; (iv) a change in the threshold value for generation of the input signal when in the auto mode; and (v) a reset of the threshold value to a factory setting Also described herein is a multi-functional control apparatus for controlling an electronically switchable optical device. The apparatus includes a photosensor that generates an ambient light input signal; a switch that generates a switch signal, wherein the switch is actuable in predetermined sequences, and a control circuit adapted for use with the optical device. The control circuit receives the ambient light input signal and the switch signal. Actuation of the switch enables a state change of the optical device. And, the predetermined sequences and a predetermined value of the ambient light signal enable at least two of the following features of the optical device: a system change between an auto mode and a manual mode, a threshold setting for generation of the ambient light input signal, or a reset of the threshold setting to a factory setting.

In one embodiment, the device includes at least two sub-cells and actuation of the switch in another predetermined sequence enables a device color change by changing the state of the two sub-cells in the device.

BRIEF DESCRIPTION OF THE DRAWINGS

These and other features and advantages of the present invention will become better understood with regard to the following description, appended claims, and accompanying drawings.

FIGS. 6A and 6B are diagrams and tables showing examples of various color states when the optical device has two sub-cells.

FIG. 7 is a diagrammatical representation of the flow chart in FIG. 4, showing an example of the various actuation sequences of the multi-functional control apparatus and the operational states associated with each sequence.

DESCRIPTION

Figure 1:
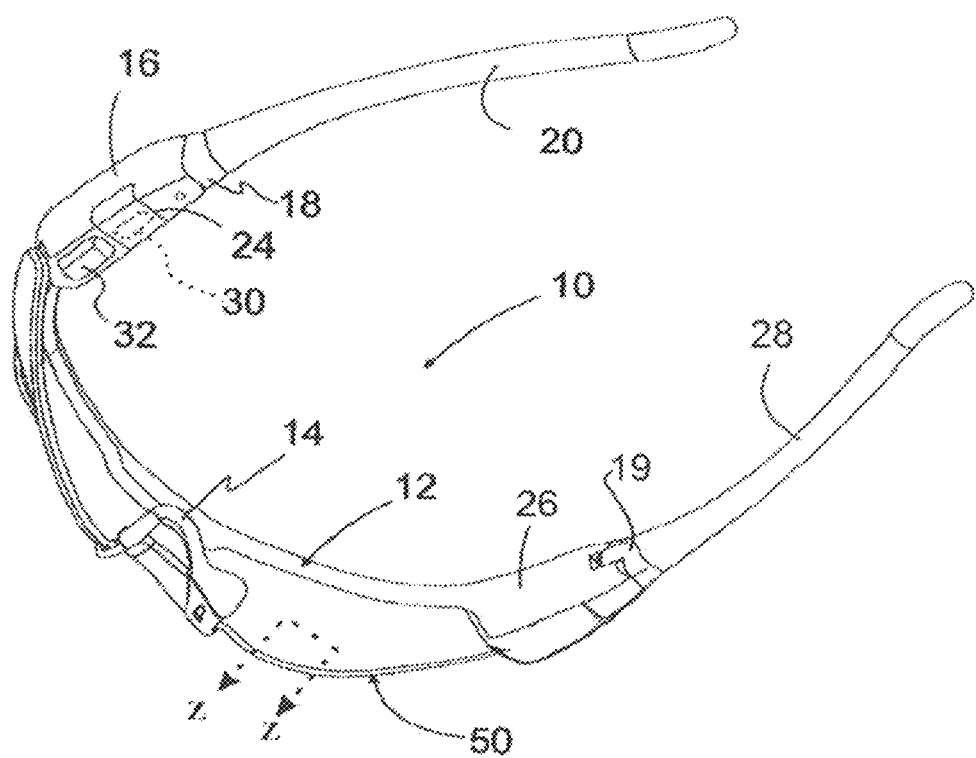
FIG. 1 is a bottom perspective view of an optical device such as eyewear according to the concepts of the present invention.

The structures shown schematically in the drawings have parts that are examples of the elements recited in the claims. The illustrated structures thus include examples of how a person of ordinary skill in the art can make and use the claimed invention. It is described here to meet the enablement and best mode requirements of the patent statute without imposing limitations that are not recited in the claims.

The present invention relates to an electronically switchable optical device (ESOD) containing a multi-functional control apparatus (MCA), a multi-functional control apparatus (MCA) for use with an ESOD, and a method for controlling an ESOD to affect various operational features, as described below.

The ESOD may be in the form of eyewear such as goggles, sunglasses, ophthalmic lenses and visors whose transmission can be changed, as will be described in detail below. One example of an ESOD is shown in FIG. 1 and generally designated by the numeral 10.

The device 10 includes a frame 12 which may include a nose bridge 14 separating two viewing areas. Those skilled in the art will appreciate that the eyewear may be in the form of a single curved, substantially semi-hemispherical lens which extends over both the user's eyes or the eyewear may include two separate lenses, one associated with each eye. The nose bridge 14 may be formed by the frame, other material or the lens may be shaped accordingly. The frame may further include flanges 16 and 26 that extend from either side of the frame and are integral therewith. At the end of each flange 16, 26 is a hinge 18, 19 which interconnects to a temple 20, 28, respectively. Although the hinges 18, 19 are shown interconnecting the flanges with the temples in the present embodiment, it will be appreciated that the hinges may be configured such that the flanges and temples are integral pieces and the hinges connect the flanges to the frame. In an alternative embodiment, the frame, flanges and temples could comprise a single integral piece.

In this example, the optical device 10 is battery operated. The battery may be rechargeable through a port 30 which may be located on the underside of the flange 16 (or the flange 26) under a flap 24. The port 30 may be located on any part of the eyewear that is convenient, and may be in any configuration known in the art, e.g. a USB, micro USB or a mini-USB connector or plug, so as to allow for recharging of a battery that is carried within the flange 16 (or 26). In other embodiments it will be appreciated that the battery may be a replaceable battery of appropriate size, or it may be chargeable in a wireless fashion. Wireless charging uses a charging station or a charging mat that plugs into the outlet of a home. This station/mat generates an electromagnetic field. The eyewear would then incorporate a coil of wire that "connects" to the electromagnetic field and uses the energy supplied by the field to charge the battery. The eyewear is placed on the station/mat (encompassed by the field) to charge up. Thus, in such an example, there is no need to plug the eyewear into anything and no need for a port.

On the underside of the flange 16 is a switch 32. The positioning of the port 30 and the switch 32 on the underside of the flange 16 provides one example; however, it will be appreciated that the port 30 and/or switch 32 can be located anywhere on the other flange 26, on the body of the device such as on any side of the hinge 18, 19 and/or any side of the frame 12 or temple 20, 28. In some embodiments, the switch may be remotely positioned. In some embodiments, only a single switch is provided to obtain a number of operational states of the device. In other embodiments, two switches or more may be provided.

Figure 12A:
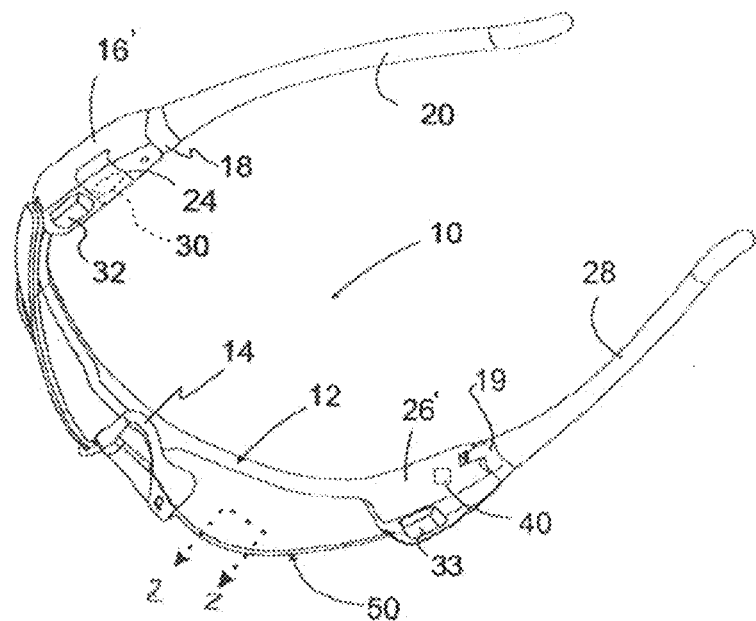
FIG. 12A is a bottom perspective view of an alternative embodiment of the optical device having two switches.

In some embodiments, as illustrated in FIG. 12A, it may be useful to have two switches. These can have identical functionalities, for example to accommodate users of different handedness as a left-handed user may prefer a switch that is located on the left flange or temple while a right-handed user may prefer a switch that is located on the right flange or temple. This can also be important for athletes or soldiers where one hand is occupied and cannot be used to operate the eyewear. Alternatively, the two switches can have different functionality, each used for a set of unique functions. In some examples, the switches can have a mixture of one or more identical functionalities (i.e. where both switches perform the same function) and one or more unique functionalities not shared by the other switch.

Figure 12B:
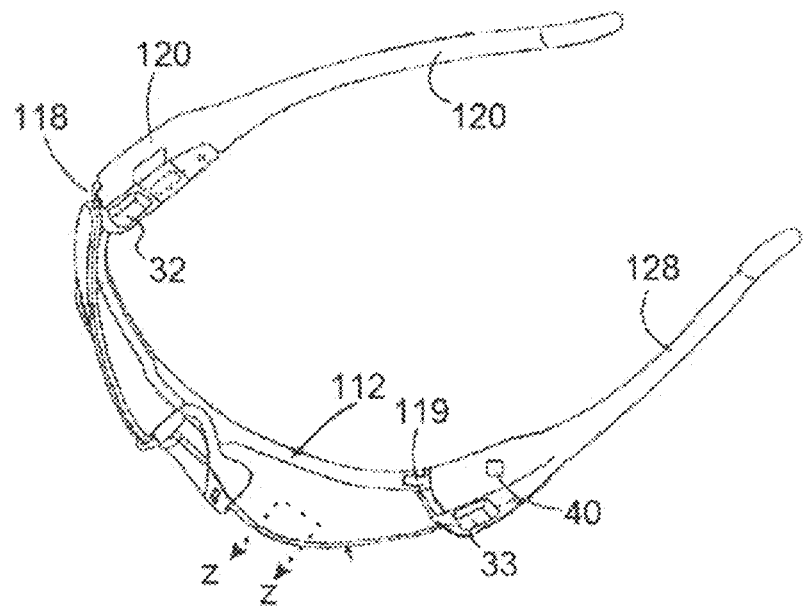
FIG. 12B is a bottom perspective view of an alternative embodiment of the optical device having two switches, without the need for flanges.

In the example of a two or dual switch device, switches 32 and 33 are located on the underside of separate flanges 16 and 26 (FIG. 12A). In some embodiments, the eyewear is without the flanges and the switches 32 and 33, as well as the electronics, are incorporated into the temples of the eyewear (FIG. 12B). In the flangeless eyewear, hinges 118 and 119 directly connect the frame 112 to the temples 120, 128, respectively. Each switch 32, 33 or both, may be a push-button switch, a rotary dial switch, a capacitive-touch switch, or any type of comparable switch known in the art. In the present embodiment, each switch is of a type which must be pressed and released for a predetermined amount of time in order to actuate or send an appropriate signal.

In some configurations, one or more switches are provided with a biasing mechanism which requires the push-button (or dial) to be pressed and then held in place to complete or close a circuit. A quick press and release of the switch may also be referred to as a "click." By using either a press and release, or a press and hold for various periods of time, a single switch can be used to initiate different operational features of the device.

In some examples, the dual switch configuration is additionally useful in providing a device free of right handed or left handed bias where both switches are configured to provide the same function (i.e. a wearer can actuate either the right or the left switch in a predetermined sequence to achieve the same function). For example, a left-handed baseball outfielder and right-handed outfielder wearing a baseball glove will each be able to operate the dual switch device equally when the switches are configured to perform the same functions. In this case, actuation sequences for each function are the same for either switch.

In other examples, a device with two switches may provide some actuation sequences and functionalities that are the same for both switches and some functionalities and/or actuation sequences that are unique to each switch.

Any embodiment of the eyewear 10 may also have a photosensor 40 (shown in FIG. 12A) which may be positioned anywhere on the optical device as long as it is exposed to the ambient light. As will be discussed in further detail, the photosensor 40 generates an ambient light signal 42 which is received by a control circuit 48 maintained in the flange 20, 26, the temple 20, 28 or other part of the frame 12.

Figure 2A:
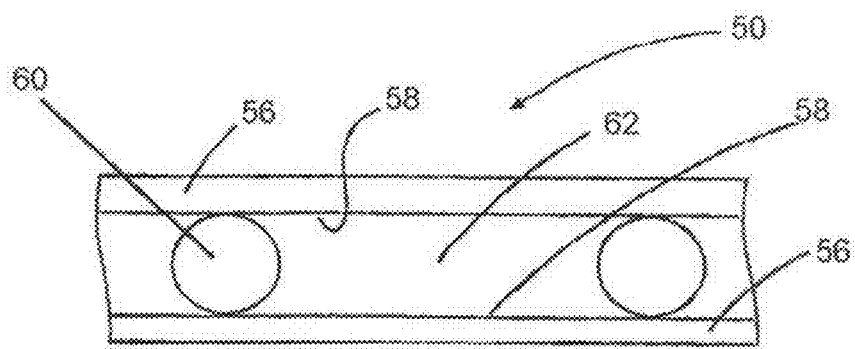
FIG. 2A is a cut away cross-sectional view of an example of the optical device showing a single cell of the eyewear according to the concepts of the present invention.

The frame 12 carries a cell 50 (FIG. 2A) which maintains an electro-optically active or controllable material that changes states or conditions when a voltage is applied and/or when a voltage is removed. The cell 50 is comprised of two spaced-apart polymer or plastic substrates 56, each of which has an interior facing surface 58. An Electro-optic material 62, which may include liquid crystal materials, dyes and/or polymeric material, is received between the substrates 56. As appreciated by skilled artisans, the interior facing surfaces may be coated with electrodes and other surface treatments suitable for controlling electro-optically active materials (e.g. an ITO layer for operating a liquid crystal based material). In some embodiments, spacers 60 may be disposed between the substrates so as to maintain a controlled distance between the facing surfaces. For example, where the cell contains liquid crystal material, the space between the substrates can be between 3-100 μm, in some examples 3-50 μm or in some examples between 3-10 μm, and has to be maintained for the cell to operate properly. For example, in one example, the cell gap or space between the substrates is maintained at 6 μm. It will further be appreciated that the facing surfaces of adjacent substrates are sealed at their respective peripheries so as to maintain the electro-optically active material between the substrates.

Skilled artisans will appreciate that the electro-optic material may be a fluid, a film or combinations thereof. In some embodiments, electro-optically active material other than liquid crystal, such as electrochromic or Kerr materials, may be maintained between the substrates 56. In any event, application of an electric field between the substrates controls the state or condition of the electro-optic material 62. In one embodiment, where no voltage (V0) is applied, the electro-optic material has its highest light transmittance (Tmax), referred to as a "clear" state, and when a predetermined maximum voltage (Vmax) is applied to the material, the material changes to its lowest light transmittance state (Tmin), referred to as a "dark," "tinted" or "colored" state. Some examples include LC/dye guest-host mixtures that depending on the color of the dye, can switch from clear to a colored or neutral (e.g. grey or brown) "dark" state.

In some embodiments the clear state has transmission between 60-100% and the dark state has a transmission of 10-50% transmission. When OFF, no voltage is applied to the cell and the device is at its highest transmission level. When ON a voltage is applied to the cell such that the transmission is lowered. The state change can be controlled either manually (MANUAL mode) or automatically (AUTO mode). Additionally, if the electronics or battery charge in the device fails, so there is no voltage applied to the cell, the cell goes clear (i.e. to its Tmax state). This "fail-to-clear" is an important safety feature of the eyewear device.

In some instances, the liquid crystal material is further able to change to one or more intermediate states having one or more intermediate light transmittance (Tn) between the Tmax and Tmin when one or more intermediate voltages (Vn) are applied. For example, if the device can have 3 intermediate transmission states T1, T2 and T3 (collectively Tn), each shall be obtained by applying a predetermined voltage level V1, V2 or V3, (collectively Vn) respectively. The level of "tint" in such a material may be adjustable (referred to as a "Tint Change" function) by applying one or more intermediate voltage levels (Vn) to achieve one or more intermediate transmission levels (Tn). Accordingly, the higher the level of "tint," the lower the light transmission of the cell.

The intermediate states can be selected either manually (by the user) or automatically according to the amount of ambient light detected by the photosensor 40.

Accordingly, each of the above examples has an ON/OFF state, such that when in an OFF state, no voltage (V0) is applied to the cell, and when in an ON state, a predetermined voltage is applied. The predetermined voltage applied in the ON state may be Vmax or any Vn, depending on the factory default setting, or depending on which voltage level has been selected by the user to be the ON state voltage. Actuation of the switch 32 (and/or switch 33) in a first predetermined sequence affects an On/Off function, causing the device to go from ON to OFF and vice versa, as required by the user.

In some embodiments, the device may comprise two or more sub-cells, each sub cell with at least one electro-optically active (e.g. liquid crystal/dye) material able to change from a state of max transmission (Tmax), to minimum light transmission (Tmin). In some examples, the one or more sub-cells are capable of having states of intermediate transmission (Tn) when an intermediate voltage (Vn) is applied.

Figure 2B:
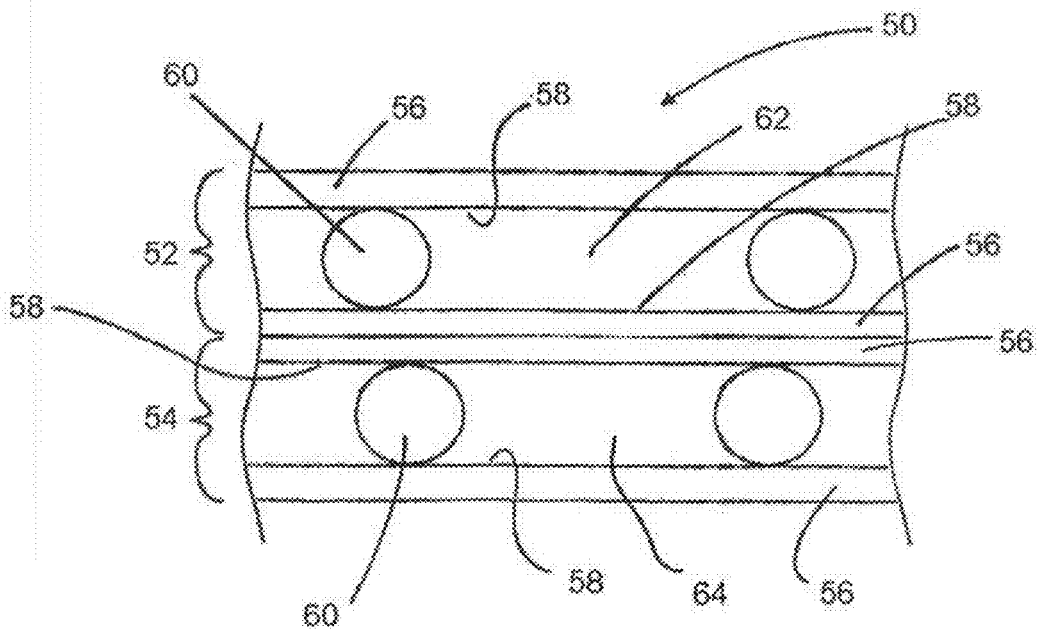
FIG. 2B is a cut away cross-sectional view of another example of the optical device showing two sub-cells of the eyewear according to the concepts of the present invention.

FIG. 2B shows two sub-cells 52, 54 arranged in a stacked manner, where at least a portion of one sub-cell overlays (is on top of) a portion of the another sub-cell. Each sub-cell has the elements of the substrate in FIG. 2A, providing two spaced-apart substrates 56, each of which has an interior facing surface 58. As appreciated by skilled artisans, the interior facing surfaces may be coated with electrodes and other surface treatments suitable for controlling electro-optically active materials (e.g. an ITO layer for operating a liquid crystal based material). In some embodiments, spacers 60 may be disposed between the substrates so as to maintain a controlled distance between the facing surfaces. It will further be appreciated that the facing surfaces of adjacent substrates that form a sub-cell are sealed at their respective peripheries so as to maintain the electro-optically active material between the substrates.

Figure 3:
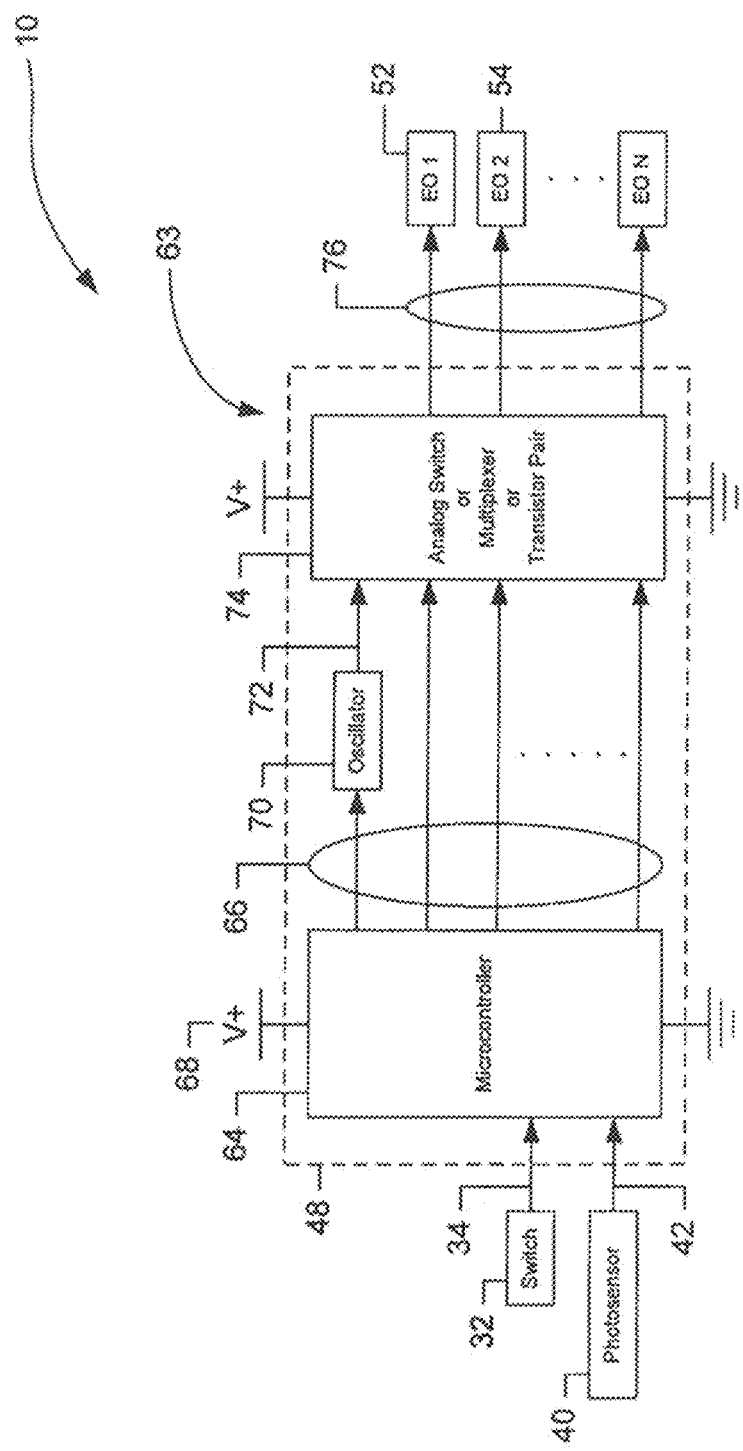
FIG. 3 is a schematic diagram of a multi-functional optical control apparatus with a control circuit implemented in an optical device according to the concepts of the present invention.

FIG. 3 shows an example of an MCA 63 associated with device 10, when the device has a single switch 32. The MCA includes a control circuit 48 which receives input from the switch 32 in the form of a switch signal 34 and from the photosensor 40 in the form of an ambient light input signal 42 (an input signal based on the ambient light level). Specifically, the signals 34 and 42 are received by a microcontroller 64 maintained within the control circuit 48 which provides the necessary hardware and software for implementing operation of the device 10. The microcontroller 64 generates controller signals 66. The microcontroller 64 receives the needed voltage from a power supply 68 which is connected to the rechargeable battery port 30. In other examples, the power supply may be a replaceable battery or a solar cell maintained by the frame 12 or other part of the eyewear. One of the controller signals 66 is received by an oscillator 70 which generates a timing signal 72. The timing signal 72 and other controller signals 66 are received by an analog switch or multiplexer 74 which generates output signals 76 so as to operate the cell 50, or each of the sub-cells 52, 54 etc. in either a manual or an automatic (AUTO) mode. As shown in FIG. 3, the sub-cells 52 and 54 are respectively identified as EO 1 and EO 2, wherein EO designates an electro-optic cell as described herein.

The user can select whether to operate the cell (sub-cells) in a Manual mode or an Auto mode by actuating the switch 32 (and/or switch 33) in a "system change" actuation sequence, thereby affecting a system change from the manual mode to the auto mode. The device may be configured for the cell (or each sub-cell) to "flash" one or more times to indicate to the user that the Auto mode has been activated.

The Manual mode refers to when the user can change the transmission or tint of the device by actuating the switch 32 (and/or switch 33) in one or more predetermined sequences by affecting an ON/OFF function, or when intermediate states are present, by affecting a tint change by actuating the switch 32 (or switch 33, or both) in another sequence to toggle between the different applied voltages, for example, to toggle between one or more intermediate voltages (Vn) and the maximum voltage Vmax to alter the level of light transmission of the cell (or each sub-cell).

In general, when in the AUTO mode, the device 10 operates in the following manner. The photosensor 40 is electronically connected to the cell 50 (or to each sub-cell 52, 54) for generating a light input signal. The photosensor monitors an ambient light level. When a bright ambient light above a predetermined level is detected, such as sunlight, an appropriate input signal 42 is generated and received by the microcontroller 64, which in turn will generate an appropriate signal to trigger an automatic application of voltage to the cell, or to at least one of the sub-cells. When the detected ambient light drops below the predetermined threshold value, the microcontroller generates a controller signal to drop the voltage to 0 (V0) and cause the cell or sub-cell(s) to return to its clear (Tmax) state.

In some embodiments, actuation of the switch in a certain predetermined sequence can change the threshold value that triggers the automatic application of voltage. In one example, the user puts the device in Auto mode, then selects an ambient light condition that would be similar to where the user would prefer the cell to change transmission/tint. In this light condition, the user actuates the switch 32 (and/or switch 33) in a new predetermined sequence to change the threshold value to the selected ambient light level, such that a detected ambient light that is as bright as, or brighter than, the selected ambient light level will trigger the automatic application of voltage. The MCA will store this custom threshold level until it is either re-programmed by the user, or reset to its factory setting by actuating the switch in a "Factory Reset" sequence.

Alternatively, a user may actuate the switch 32 (and/or switch 33) in a separate predetermined sequence to manually increase or decrease the threshold level for triggering the automatic application of voltage.

Switch Actuation Sequences:

The various functions that the user can enable by operating various actuation sequences are set out as follows:

ON/OFF Sequence

The user can affect an "ON/OFF" function in the eyewear such that when OFF, no voltage is applied to the cell and when ON, a predetermined voltage is applied to the cell. (Actuation Sequence 1) This can be achieved, for example, by a quick press and release ("single click") of the switch. The predetermined voltage applied when the device is ON is either a default voltage level (factory setting), or is selected by the user.

In some embodiments, when the device contains one or more sub-cells, the actuation sequence for affecting an ON/OFF function operates such that when OFF, no voltage is applied to either sub-cell and when ON, a voltage is applied to one or more sub-cells.

In some examples, the actuation sequence for affecting an ON/OFF function operates such that when actuated, each sub-cell toggles between an OFF state where no voltage is applied to the sub-cell, and an ON state where a voltage is applied to the sub-cell, thereby toggling between 4 states: no voltage, voltage to sub-cell 1 only, voltage to sub-cell 2 only, and voltage to both sub-cells. So where, for example, there are two sub-cells, each having a distinct tint color (e.g. sub-cell 1 is orange and sub-cell 2 is blue), the ON/OFF actuation sequence toggles between clear (V0), orange (only sub-cell 1 ON), Blue (only sub-cell 2 ON) and black or Tmin (both sub-cells 1 and 2 ON).

Auto Mode Selection Sequence

The user can select or enter an AUTO mode by actuating the switch in a separate predetermined sequence (Actuation Sequence 2). This is also referred to as a "system change" and can be achieved, for example, by quickly pressing and releasing the switch twice ("double click"), or by pressing and holding the switch for an X length of time. The operation of the device when in Auto mode is described above.

In some embodiments, when the device is in an AUTO mode, actuation of the switch in a predetermined sequence (e.g. Actuation Sequence 1) will bring the system out of AUTO mode back to MANUAL mode. Alternatively, or in addition, the controller can be programmed such that actuating the switch in sequence 1 when the device is tinted, even when the device is in Auto mode, will drop the applied voltage to 0 (V0), thereby affecting maximum transmission (Tmax). This is a safety feature which can be used to ensure the user can affect a quick transition to "clear" state whether the device is in Auto or Manual mode.

Automatic Threshold Adjustment Sequence—Selecting Ambient Light Condition

When in AUTO mode, the user may want to alter the threshold setting or ambient light condition which triggers the automatic application of voltage by selecting an ambient light value to be the user-selected threshold level for triggering the application of voltage, as discussed above. The user can do this by actuating the switch in a predetermined (e.g. Actuation Sequence 3). In one example, actuating the switch using this actuation sequence when the device is in the auto mode and in a selected ambient light condition changes the threshold value for triggering the automatic application of voltage to the selected ambient light condition. For example, the user can walk to a bright or sunny environment (selected ambient light condition), then presses and hold the switch for a predetermined time Y to set the threshold level to that selected ambient light condition. This feature allows users to customize the light condition that triggers tinting of the device.

Factory Reset Sequence

If the user has altered the threshold setting but wishes to return to the default threshold setting or factory setting, the user can actuate the switch in a predetermined Factory Reset Sequence (e.g. Actuation Sequence 4). For example, the user can reinstate the factory setting by pressing and holding the switch for a predetermined time Z. In some examples, the factory reset can be achieved whether the device is in the manual mode or in Auto mode.

Manual Threshold Adjustment Sequence

In some examples the user can manually adjust the threshold level without having to find and "select" an ambient light condition. This alternative manner of adjusting the threshold may be desirable if the user is wearing the eyewear in Auto mode, the eyewear darkens and the user realizes he does not want the darkening voltage to be triggered in that particular light condition (i.e., he prefers the eyewear to remain in the clear mode). Or, if a user is wearing the eyewear and it remains clear in a bright light and the user wishes the automatic darkening to have been triggered. In these cases, the user can actuate the switch in a further actuation sequence (the Manual Threshold Adjustment Sequence) to manually increase or decrease the threshold value for triggering the automatic application of voltage. In one example, where the device has two switches, one switch can be used to increase the threshold value using a predetermined sequence while the other switch can be used to decrease the threshold value while using the same or different predetermined sequence.

Intermediate State Selection Sequence

In some examples, the liquid crystal material in the cell is further able to change to one or more intermediate states having one or more intermediate light transmittance (T1, T2, etc., collectively referred to as Tn) between the Tmax and Tmin when one or more intermediate voltages (V1, V2, etc., collectively referred to as Vn) are applied. In such a device, the user can adjust the darkness level or tint of the cell depending on the user's preference, e.g. given the same light conditions, some users prefer a "darker" setting while some may prefer a "lighter" setting. Accordingly, the user can actuate the switch in a predetermined sequence to adjust the tint, referred to as affecting a "TINT change", by changing the voltage signal supplied to the cell so it can be set "darker" or "lighter" when in a particular ambient light environment.

For example, the switch may be actuated in an Intermediate State Toggle Sequence to select or toggle the applied voltage between one or more intermediate voltages (Vn) and the maximum voltage (Vmax), to alter the level of light transmission of the cell. In some examples, the toggling sequence may also toggle through V0. In some instances, every actuation of the switch in this Intermediate State Toggle Sequence will increase (or decrease) the voltage applied, thereby decreasing (or increasing) the transmission, respectively, in a step-wise fashion. Once the max voltage is reached through toggling, another actuation in the predetermined sequence returns the applied voltage to minimum voltage (e.g., T1) or to V0 (Clear), depending on the design of the microcontroller. (See FIGS. 11A and 11B)

In some embodiments, where the device has two switches 32 and 33, one switch, actuated in a predetermined sequence, can affect an increase in the voltage applied and the other switch, actuated in the same predetermined sequence, can affect a decrease in the voltage applied.

Device Having Two Switches with Identical Functionality

In some embodiments the device is equipped with two switches, as seen in FIGS. 12A-12B. In one example, switches 32 (S1) and 33 (S2) are connected to one port of the microcontroller as in FIG. 13. This means that the microcontroller cannot differentiate between an actuation of switch 1 and switch 2 and actuating switch 1 affects the same result as actuating switch 2, i.e., the switches perform identical functions for each actuation sequence. This embodiment is able to accommodate users of different handedness.

Device Having Two Switches with Different Functionality

Figure 14:
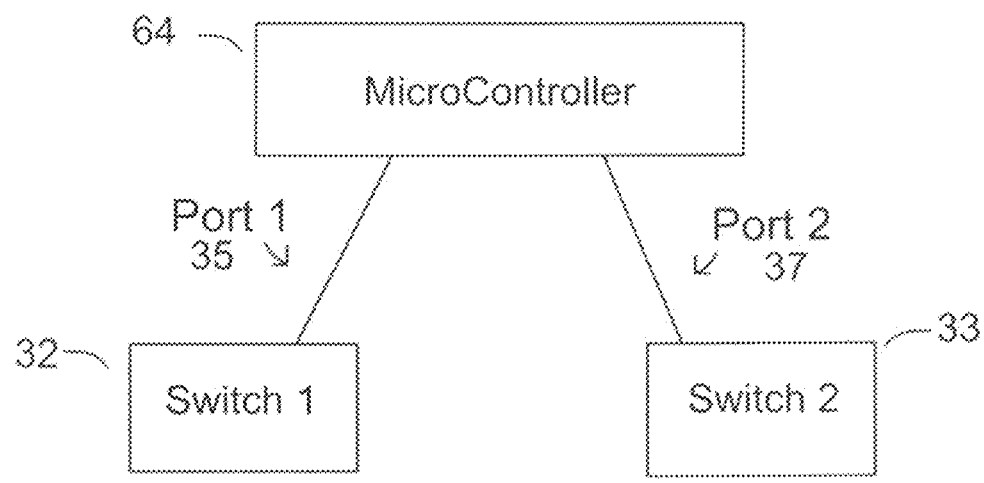
FIG. 14 is a diagrammatical representation of two switches in different ports of the microcontroller.

In other embodiments, the device is similarly equipped with two switches, as seen in FIGS. 12A-12B, but here, the switches 32 and 33 are connected to separate ports 35 and 36, of the microcontroller as seen in FIG. 14. This means that the microcontroller can differentiate between an actuation of switch 1 and switch 2. This allows the switches to not only perform identical functions but also perform separate or complimentary functions. For example, one switch can be used to increase tint while the other switch performs a decrease tint function. In a similar manner, the threshold value which triggers automatic application of a voltage in the automatic mode can be manually adjusted by increasing and decreasing the value with switch 1 and 2, respectively.

In some embodiments one switch is used for a forward toggling of a function while the other switch is programmed for backwards toggling. For example, in a stacked sub-cell configuring with multiple colors, switch 1 can toggle varying colors in one direction: blue→orange→neutral→blue . . . etc., while switch 2 can toggle in the reverse direction: neutral→orange→blue→neutral . . . etc.

If the device factory setting is such that the right switch performs one set of functions and the left switch performs a different set of functions, a further actuation sequence (e.g. pressing both switches at the same time) can swap the set of functions performed by each switch, thus changing the handedness of the device such that the right switch performs what the left switch was programmed to do and the left switch performs the programmed functions of the right switch.

Device Having a Remote Switch

Figure 20:
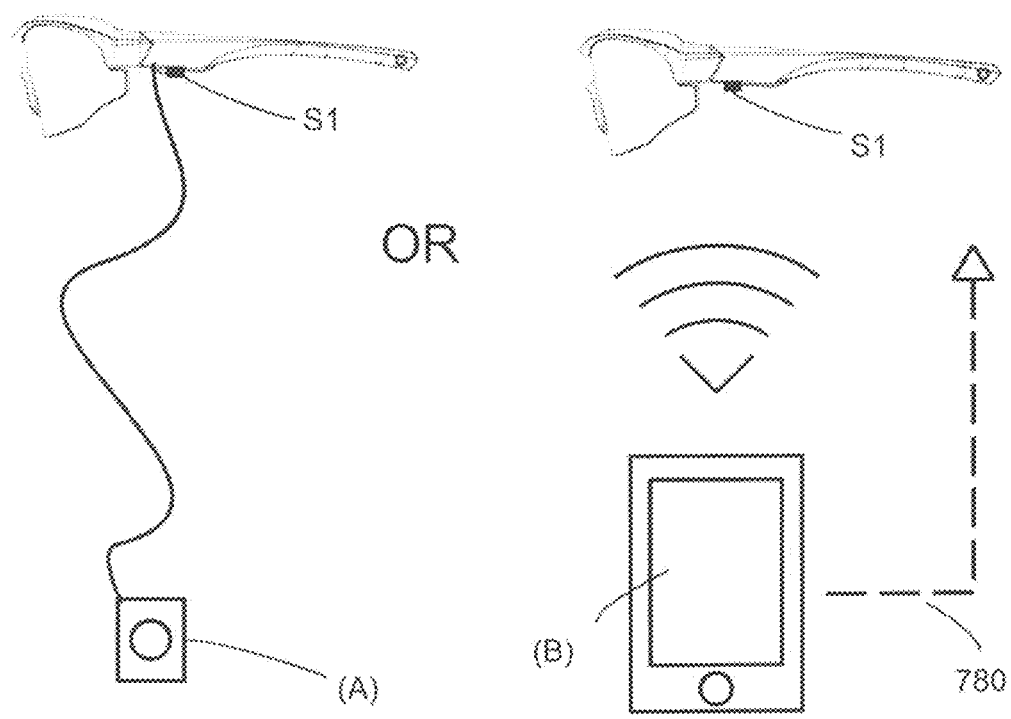
FIG. 20 is an alternative embodiment showing an optical device coupled to a remote switch.

In some embodiments the device accommodates at least two switches, where at least one switch is located on the device, and one switch is positioned remotely. The remote switch is either a wired switch (A) or a wireless switch (B) (FIG. 20). The remote switch is capable of producing one or more remote signals 780 to enable one or more user commands. Actuation of the remote switch allows the user to operate various functions of the device while eliminating the need to reach and touch the switch located on the eyewear itself.

The wireless switch can connect to the device though means known in the art including but not limited to Bluetooth, radio frequency (RF), etc. In some examples the remote switch is a smart device, such as a smart phone or tablet, that is wirelessly connected to the eyewear device. The smart device is programmed to run a software application providing a graphical interface having a predetermined set of labeled buttons and slides corresponding to one or more user commands. (FIG. 21) The microcontroller is also programmed to translate each user command received to affect a function in the eyewear. In this way, the user will be able to see the functions being actuated, and any status or other visuals regarding the status of the eyewear, such as whether the eyewear is in Auto or Manual mode, the tint level, threshold level, battery charge level, etc. Such a remote switch also expands the number of actuation sequences that can be affected, increasing the user's control over the eyewear's functionality.

Device Having Two or More Sub-Cells

In the embodiment where the device has one or more sub-cells, actuating a switch in an ON/OFF sequence will apply a preselected voltage to one or more sub-cells separately to achieve different states, tints or colors, as discussed above. A "lens" refers to the combination of the stacked sub-cells and will have the color of whichever one or more sub-cells is in the On or tinted state.

In some embodiments, the user may exert greater control over the tint or color by pre-selecting different configurations for the ON state of the device. Once the user pre-selects the configuring of sub-cells to be activated when the device is turned ON, that configured is set as the default. For example, in a two sub cell device, the configurations that can be selected are: (a) Sub-Cell 1 tinted and Sub-Cell 2 clear, (b) Sub-Cell 1 clear and Sub Cell 2 tinted, and (c) both Sub-Cell 1 and 2 tinted. When a configuring is set, for example configuration (b), actuating the switch in a predetermined sequence (e.g. first actuation sequence) will change Sub-cell 2 from a clear to a tinted state and vice versa, while leaving Sub-cell 1 always clear. When the eyewear is in the AUTO mode, the default cell configuration set by the user is employed. For example, if configuration (b) is set as the default and the device is in the AUTO mode, when the ambient light is such that the predetermined threshold is met, only sub-cell 2 changes from the clear to tinted state.

In some embodiments the sub cells have different colors and the user can select the color of the device. For example, if sub-cell 1 is amber and sub-cell 2 is blue, the colors can be switched from amber (amber sub-cell 1 is in colored state, blue sub-cell 2 is clear), to blue (amber sub-cell 1 is clear, blue sub-cell 2 is in colored state) or grey (both amber and blue sub-cells 1 and 2 are in colored state). This is shown in FIG. 6A.

In an alternative embodiment, the user can differentiate between which lens (Left or Right lens) voltage is applied to. In this example, the left and right lens can be set to have different colors simultaneously, such as in a 3D pair of glasses where one lens has a blue color and the other lens is red. Alternative examples include situations where one lens is set to be clear while the other lens is tinted or colored. This last example may be used where the user needs to see a display projected or otherwise produced on one lens (typically made to be dark so the display can be easily seen), while the other lens is clear so the user can still see the surroundings. Any combination of voltage or tint level may be selected for each sub-cell and adjustable by user manipulation.

In the following examples, particular sequences (single click, double click, press and hold for predetermined length of time X, Y or Z, etc.) have been assigned to perform particular functions (e.g. "single click" affects the On/Off function, etc.) However, it will be appreciated that any particular sequence can be assigned to perform any of the functions described above as the design needs dictate. Thus, the examples and actuation sequences presented in the Examples below should not be interpreted to limit the device function or the particular actuation sequences described for each function.

Below are some examples of how the predetermined sequences have been, or may be, implemented.

Example 1

Figure 4:
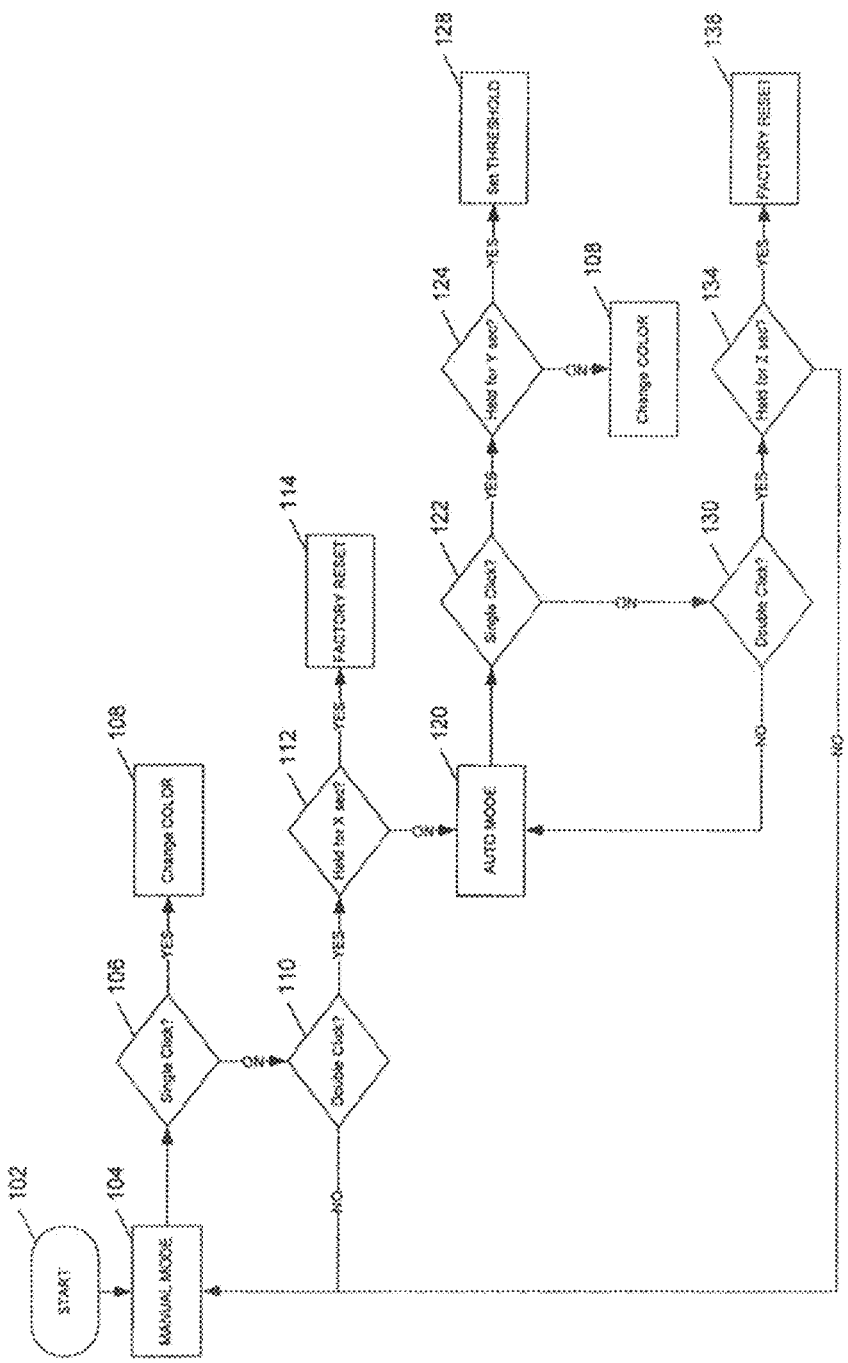
FIG. 4 is an operational flowchart showing the steps implemented by the control circuit according to the concepts of the present invention.

Referring now to FIG. 4, one example of an operational flowchart for operation of the MCA is designated generally by the numeral 100. It will be appreciated that the operational flowchart is embodied in software maintained by the microcontroller 64 of the control circuit 48. Initially, at a start designation 102, the device is switchable to various features with only the use of a single user-actuated switch. Accordingly, the device starts in a manual mode 104 and awaits detection of a switch actuation. The switch actuation may be in the form of a press and release of the switch 32, also referred to as a single click. A "double click" consists of a press and release of the switch followed shortly thereafter of another press and release. It is appreciated that the double click must be distinguished by the electronics from a single click. This can be achieved by controlling the timing needed between the two press and releases. In some instances, a function or operation of the device may be initiated by a single or double click followed by a press and hold of the button. The time period between what constitutes a double click operation may vary as needed in the microcontroller. In any event, upon detection of a single click at step 106, the methodology indicates that it is a desire of the user to change the state of the cell 50 and the process proceeds to step 108 which will be described in detail later. However, if a single click is not detected, the process proceeds to step 110 to determine whether a double click is detected or not. If a double click is not detected, then the process returns to the manual mode. However, if a double click is detected at step 110, the process proceeds to step 112 wherein the microcontroller determines whether the switch is being pressed and held for a predetermined x period of time, e.g. such as 20 seconds. Skilled artisans will appreciate that this period of time may be adjusted as appropriate. In any event, if at step 112 it is determined that the switch is held for the designated period of 20 seconds then the microcontroller initiates a factory reset procedure at step 114. During the factory reset procedure, the threshold value of the photosensor 40 is reset to a factory-established value.

At step 112, if the button is released prior to expiry of the predetermined period of time, then the device goes into an AUTO MODE at step 120. Additionally, upon following step 110, the user is able to set the ambient light threshold level for effecting a state change as needed by. Accordingly, once in the auto mode 120, if a single click is detected at step 122 and the button is then subsequently pressed and held for a predetermined y period of time, such as 5 seconds, then the threshold value for the photosensor 40 is adjusted at step 128. In addition to the direct change when the threshold value is set, the microcontroller 64 can take the light level, in the form of a voltage value, and create two thresholds, an upper threshold and a lower threshold. In this manner, the system has hysteresis such that oscillation of the sub-cell does not take place. In other words, the hysteresis is the difference between the upper and lower threshold so that the sub-cell does not rapidly fluctuate between a clear state and a colored state when the ambient light level is at the designated cross-over value. In any event, when the threshold value is set by the user at step 128, the sub-cell flashes between the two states to indicate that a change has occurred. As such, it will be appreciated that the user needs to position the device so that the photosensor detects an ambient light level the user desires for the state of the sub-cell to change between a clear state and a colored state. For example, if the user wants the threshold value to be initiated at a low ambient light signal, the device would be positioned in such an area. Alternatively, if the user wants a high ambient light level to be utilized, they can change the threshold value in direct sunlight.

Returning to step 124, if the switch is not pressed and held for the predetermined period of time, then the process proceeds to the state or color change operation 108 to be described.

Returning to step 122, if a single click is not detected, then the process proceeds to step 130 to determine whether a double click of the switch is detected. If not, then the process returns to step 120 and the device remains in the auto mode. However, if a double click is detected at step 130, then at step 134 it is determined whether the button is pressed and held for a predetermined z period of time, such as 20 seconds, at step 134. If this is the case, then at step 138 a factory reset procedure is initiated at step 138 and the threshold value is reset. However, if at step 134 the button is not held for the predetermined period of time, the process returns to step 104 and the device enters the manual mode.

Figure 5:
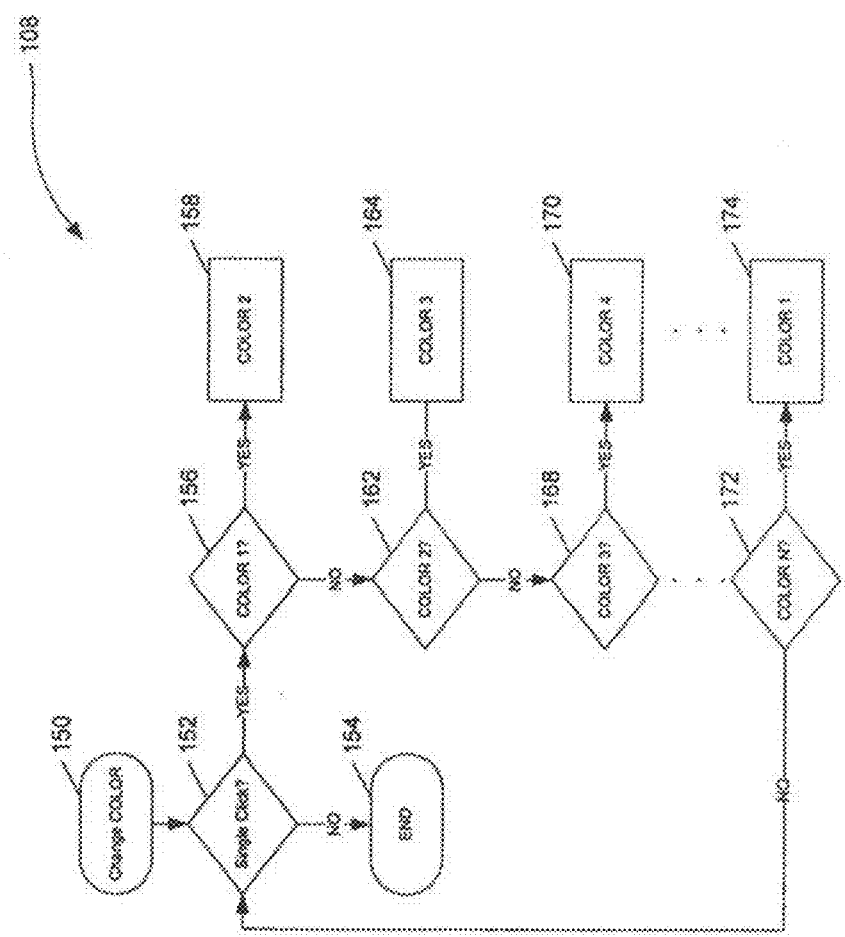
FIG. 5 is an operational flowchart showing adjustment of an operational state, such as various colors, utilized in an example of the optical device according to the present invention.

Referring now to FIG. 5, the state change, which in this example is also referred to as a color change process is shown and is designated generally by the numeral 108. In the embodiment disclosed, there are two liquid crystal sub-cells and, as such, there are four possible color conditions that may be employed. Color 1 is the condition where both sub-cells are in a clear condition, color 2 is where only one sub-cell is in a tint condition and the other sub-cell is clear, color 3 is where the first sub-cell is in a clear condition and the other sub-cell is in a tint condition and color 4 is where both sub-cells are in a tint condition. Accordingly, in one example, color 2 could be an amber tint, color 3 could be a blue tint and color 4 could be a combination of blue and amber so as to provide a third colored condition. These color conditions are also shown in FIGS. 6A and 6B.

The process 108 starts at step 150. Next, at step 152, it is determined whether a single click is detected or not. Generally, a single click will toggle between the four color states (three color states and a clear state). Accordingly, if a single click is not detected, then at step 154 the change state operation ends and the process returns to the main operation. However, if a single click is detected at step 152, then at step 156 the current state or color of the cell is checked. If the condition or color at step 156 is clear, then the process continues to step 158 and color 2 is selected. If color 1 is not the current color of the cell 50, then the process continues to step 162 and if that color is the current state then the next color is selected at step 164. However, if color 2 is not present at step 162, then the process inquires at step 168 if color 3 is present. If this is the case, then the color is changed to color 4 at step 170. But if at step 168 the color is not what is being selected, then it is presumed at 172 that the final color is the current condition and that is changed so as to return to color 1 at step 174. If some other signals are received, then the process returns to step 152. In this manner it can be seen that a user can simply click through the colors until the desired color is obtained.

Referring back to FIG. 4, it can be seen that the color can be changed in either the manual mode utilizing steps 106 and 108, or by initiating the auto mode at step 120 and then initiating steps 122 and 124.

FIG. 7 is a diagrammatical representation of the flowchart in FIG. 4 and shows an example of the various actuation sequences of the multi-functional control apparatus in this example and the operational states associated with each sequence.

Example 2

Figure 8:
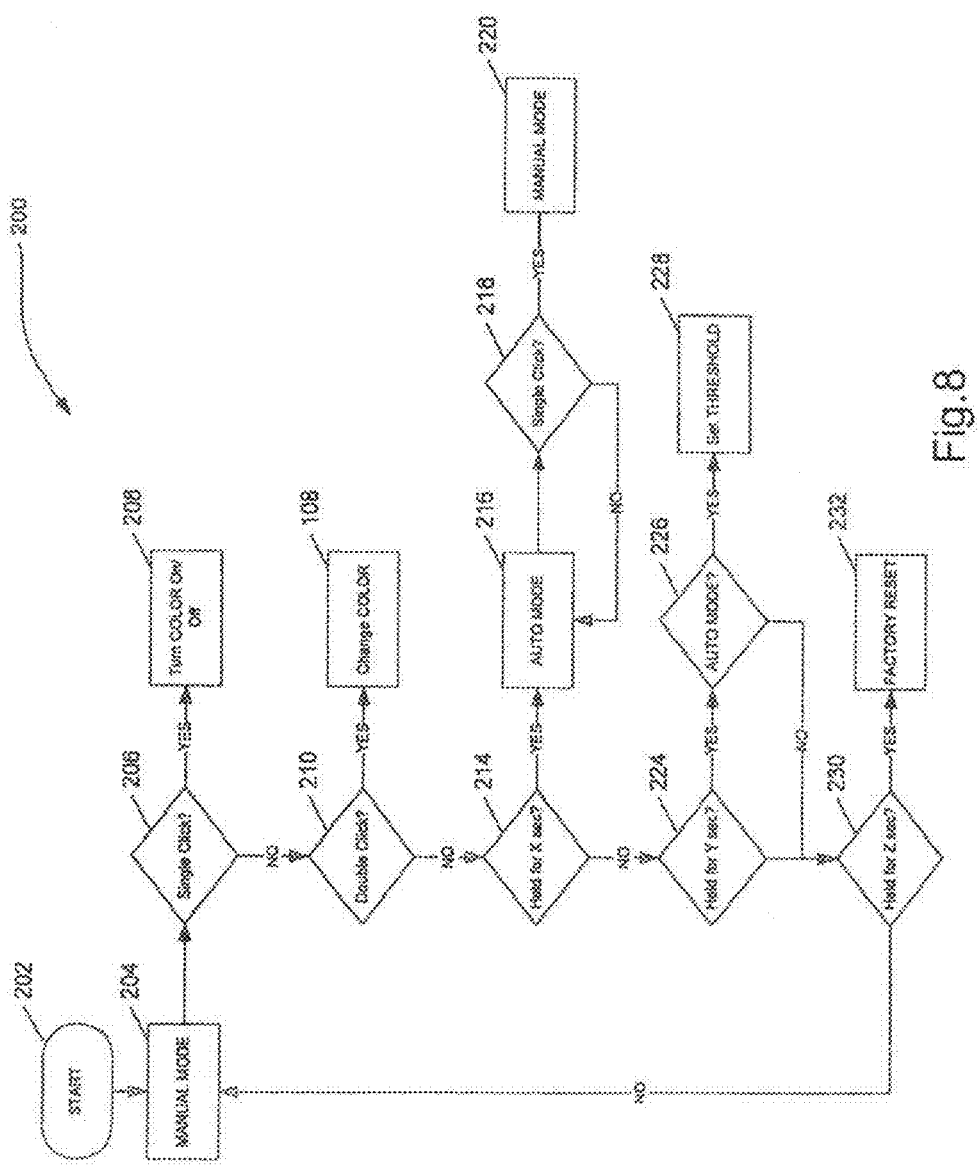
FIG. 8 is an operational flowchart of an alternative embodiment, showing alternative steps, implemented by the control circuit according to the concepts of the present invention.

Referring now to FIG. 8, an alternative embodiment of the operational method of the MCA utilized by the control circuit 48 is designated generally by the numeral 200. In this embodiment, the process starts at step 202 and subsequently defaults to the manual mode 204. If a single click is detected then a signal is generated by the microcontroller 64 to change the state or turn the sub-cells(s) on or off at step 208. In other words, if the condition of the cell 50 is a particular color, then that particular color is changed to a clear state or in the alternative, a clear state is changed to the desired colored state. If at step 206 a single click is not detected but a double click is detected, then at step 210 the color is changed from one state to another as set out in the change color operational steps 108 as shown in FIG. 5. However, if a double click is not detected at step 210 but the button is pressed and held for about x seconds, for example 2 seconds or other predetermined period of time, at step 214, then the control circuit 48 enters the auto mode at step 216. In the auto mode, actuation of a single click (step 218) causes re-entry into the manual mode. In this particular configuration, when the device is in the auto mode, the photosensor detects the ambient light level and changes the state of the cell 50 accordingly. However, the auto mode can be disengaged by a single click button actuation and the device returns to the manual mode at step 220.

Returning to step 214, if the button is held for about y seconds or other predetermined period of time longer than the period of time set out in step 214, then the process enters the auto mode at step 226 and, if no further actions are taken, the threshold value is set at step 228 according to the observed ambient light in a manner similar to step 128. However, to reset the threshold level to the factory setting, the button can be pressed and held for Z seconds (which in this example is longer than y seconds), so that the process proceeds to step 230 and the factory reset procedure is implemented at step 232. If at step 230 the button is released prior to expiry of the designated time period, then the device returns to the manual mode 204.

Figure 9:
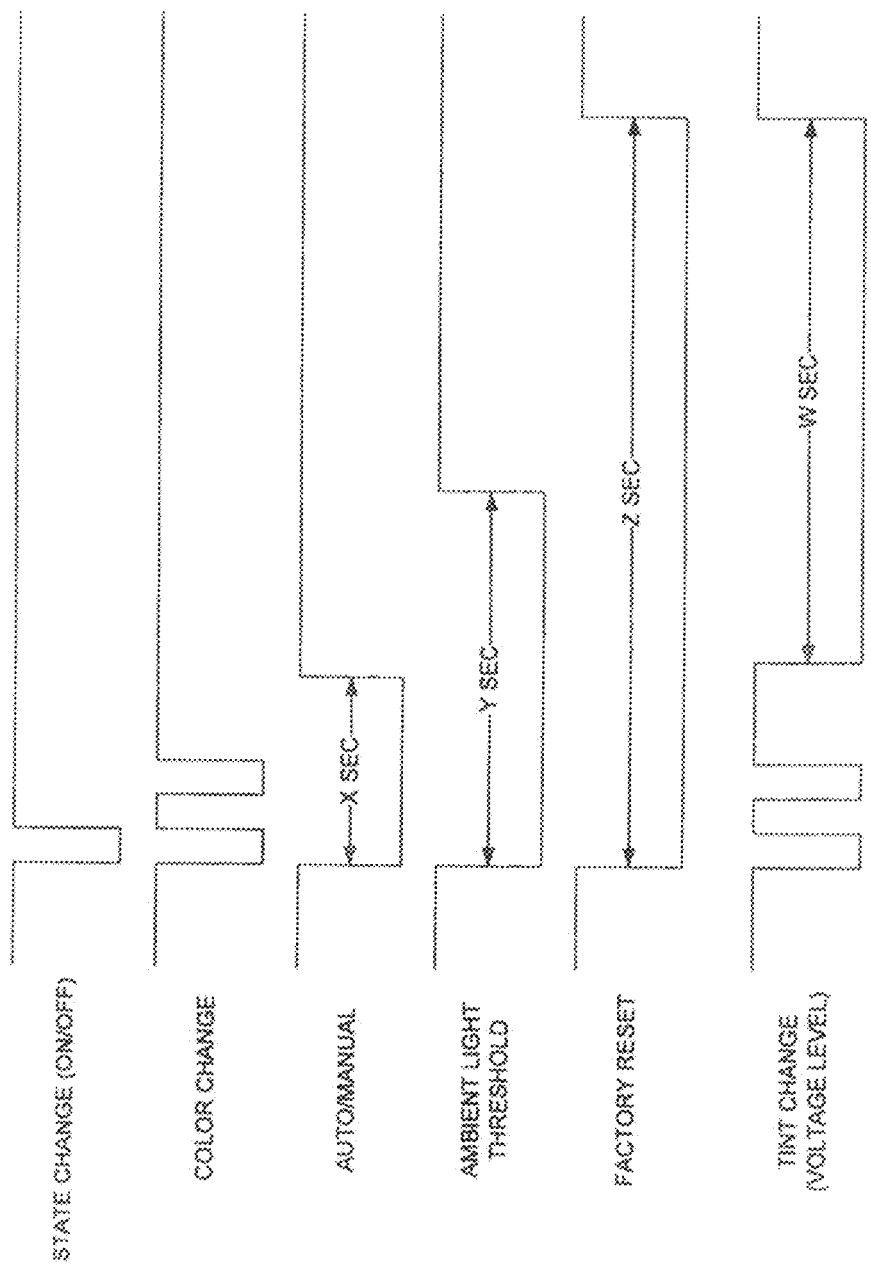
FIG. 9 is a diagrammatical representation of the flow chart in FIG. 8, showing an example of the various actuation sequences of the multi-functional control apparatus and the operational states associated with each sequence.

FIG. 9 is a diagrammatical representation of the flow chart in FIG. 8, showing an example of the various actuation sequences of the multi-functional control apparatus in this example and the operational states associated with each sequence Example 3

This example highlights a device having means to adjust the "darkness" or "tint" of the cell or sub-cells in any given light, in either manual or auto mode. In this example, the user can actuate the switch in a predetermined "Tint Change" sequence to change the voltage signal supplied to the cell so it can be set "darker" or "lighter" when in a particular ambient light environment.

Figure 10:
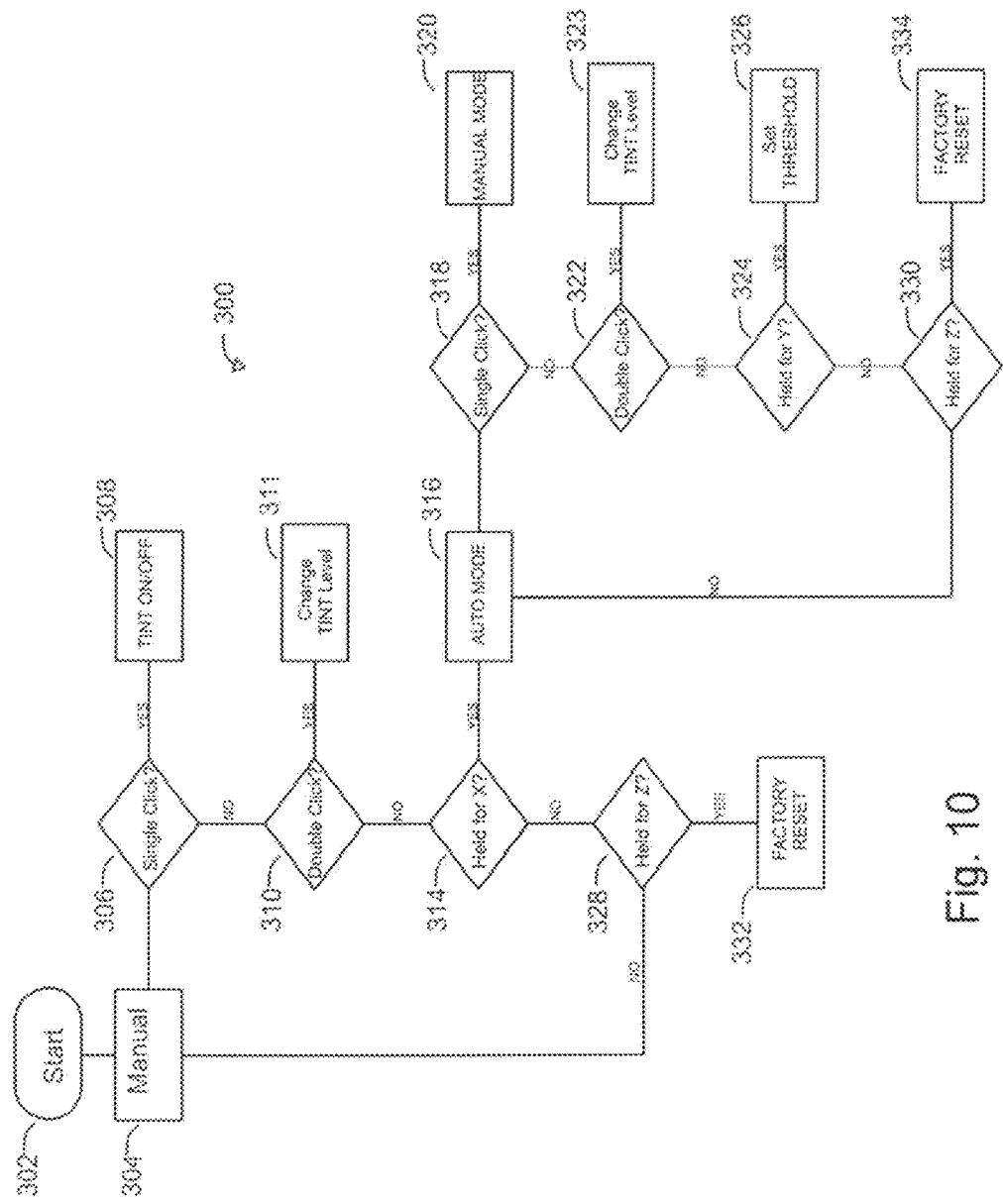
FIG. 10 is an operational flowchart of an alternative embodiment, showing alternative steps, including a tint-change operation.
Figure 11A:
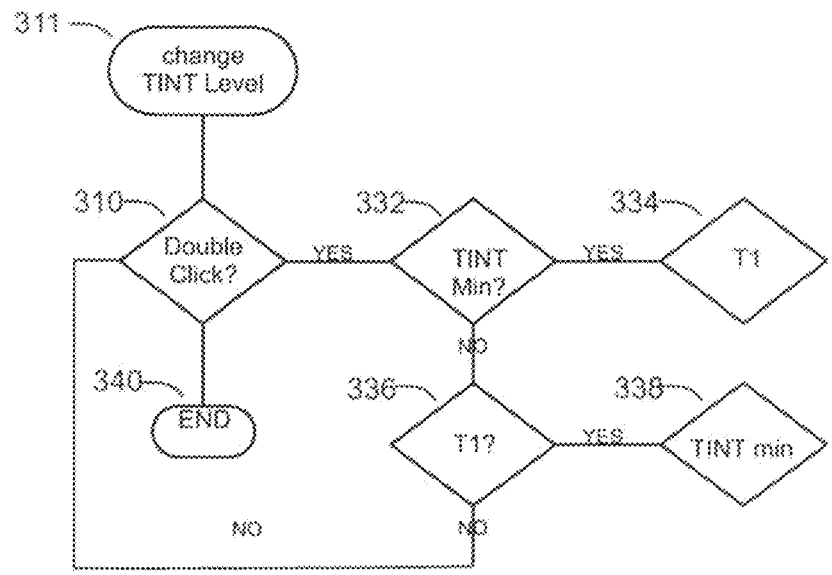
FIGS. 11A and 11B are operational flowcharts showing two examples of the change tint level operation.
Figure 11B:
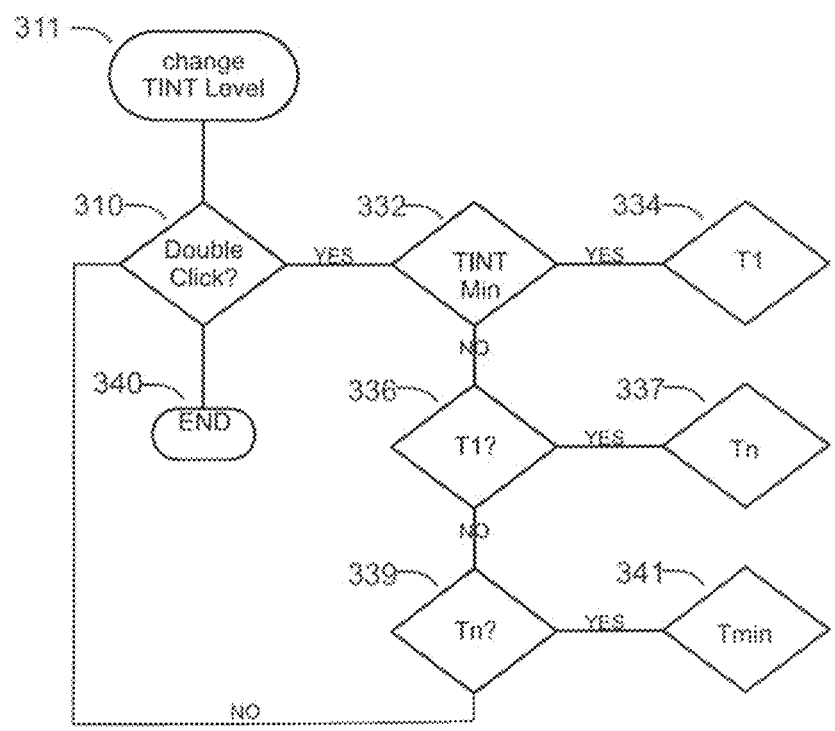

Referring now to FIG. 10, an alternative embodiment of the operational method of the MCA utilized by the control circuit is designated generally by the numeral 300. In this embodiment, the process starts at step 302 and subsequently defaults to the manual mode 304. If a single click is detected, then a signal is generated by the microcontroller 64 to change the state or turn the sub-cells(s) On or Off 308. In other words, if the condition of the cell 50 is a tinted or particular color (On), then the cell is changed to a clear state (Off), and vice versa, a clear state (Off) cell is changed to a tinted/colored state (On). If at step 306 a single click is not detected but a double click is detected 310, then the tint level of the ON/colored cell or sub-cell is changed via operational steps 311, as shown in FIGS. 11A-B. In this example, there are two tinted states: a "darker" state of minimum light transmission (Tmin) and a "lighter" intermediate state of intermediate light transmission (T1), each state having a different tint/transmission level. For example, T1 state has a transmission level of 20% and the Tmin state has a transmission level of 10%. These transmission levels are given as examples and it will be appreciated that they can be any % transmission value obtainable with the electro-optic material. If a double click is detected at 310 and the cell is in the Tmin state 332, then the cell will switch to the T1 state 334. If the cell is in the T1 state 336, then the cell will toggle to the Tmin state 338. In some examples, once the tint level is selected, that tint level will be the default setting for all modes, i.e. if a user prefers T1 to Tmin when the device is turned On, then he can select the device to go between Off (clear) and On (T1), either when manually activated (On/Off sequence) or when in Auto mode.

However, if a double click is not detected at 310 but the button is pressed and held for about X seconds 314, for example 2 seconds or other predetermined period of time, then the control circuit 48 enters the auto mode 316.

In the auto mode, actuation using a single click 318 reverts the device into manual mode 320. In this particular configuration, when the device is in the Auto mode, the photosensor detects the ambient light level and changes the state of the cell or sub-cell accordingly. In other words, the Auto mode can be disengaged by a single click button actuation, where power is no longer provided to the cell, resulting in a clear state of the cell and a return to the manual mode at step 320.

In the Auto mode, actuation using a double-click 322 causes the transmission/tint level of the on/colored state to change as set out in the tint change operational step 323 in a manner similar to step 311.

After the device enters the automatic mode, if the button is pressed and held for about Y seconds 324, for example 4 seconds or other predetermined period of time different than the period of time X set out in step 314, then the threshold value for triggering automatic application of voltage is set according to the surrounding ambient light (step 326).

If while either in the manual mode or Auto mode, the button is pressed and held for about Z seconds, steps 328 and 330, a factory reset procedure 332 and 334 is implemented, returning the ambient light threshold value back to the original factory settings.

If at step 330 or 232 the button is released prior to expiry of the designated time period Z, then the device returns to the manual mode 304.

Example 4

Figure 13:
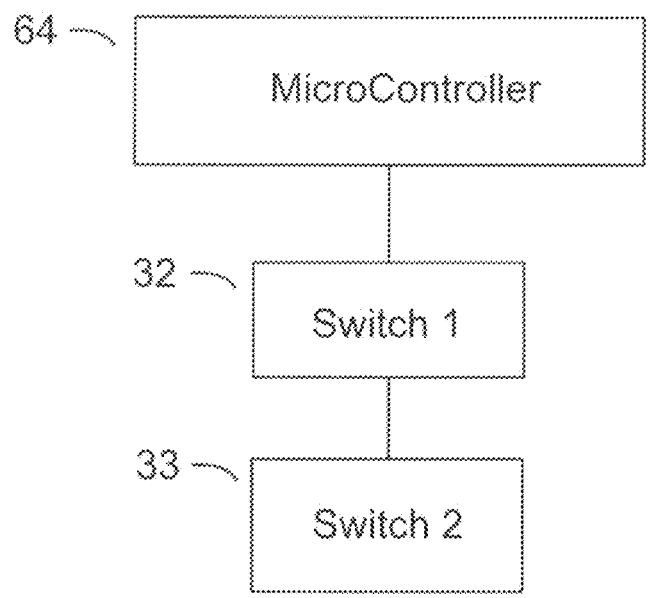
FIG. 13 is a diagrammatical representation of two switches in parallel with the microcontroller.

This is an example of how a device with two switches may be operated. In one example, the two switches 32 and 33 are connected in parallel, as illustrated in FIG. 13. This means that the microcontroller 64 cannot differentiate between the two switches. The actuation of either switch in a predetermined sequence (i, ii, iii, etc.) provides the corresponding function (i, ii, iii, etc.) of that predetermined sequence so both switches have identical functionalities. In other words, the first, second, third or any designated actuation sequence affecting function (i), (ii) and (iii), etc., respectively, is the same for the either switch.

Example 5

In this example, switches 32 and 33 are in communication with the electronics such that the microcontroller 64 can differentiate actuation of switch 32 from actuation of switch 33. One way to accomplish this is to connect each switch to different ports 35 and 37 of the microcontroller 64, as illustrated in FIG. 14. In this way, additional features can be added to the eyewear device. This example highlights the added function of manually adjusting the threshold value that triggers automatic application of voltage (when the device is in the Auto mode). One switch (e.g. 32) can be used to increase the threshold value while the other switch (e.g. 33) can be used to decrease of threshold value, or vice versa.

Additionally, or alternatively, one switch may be used to increase tint level (reduce transmission) and the other switch to decrease tint level (increase transmission) manually through one or more actuation sequences.

Figure 15:
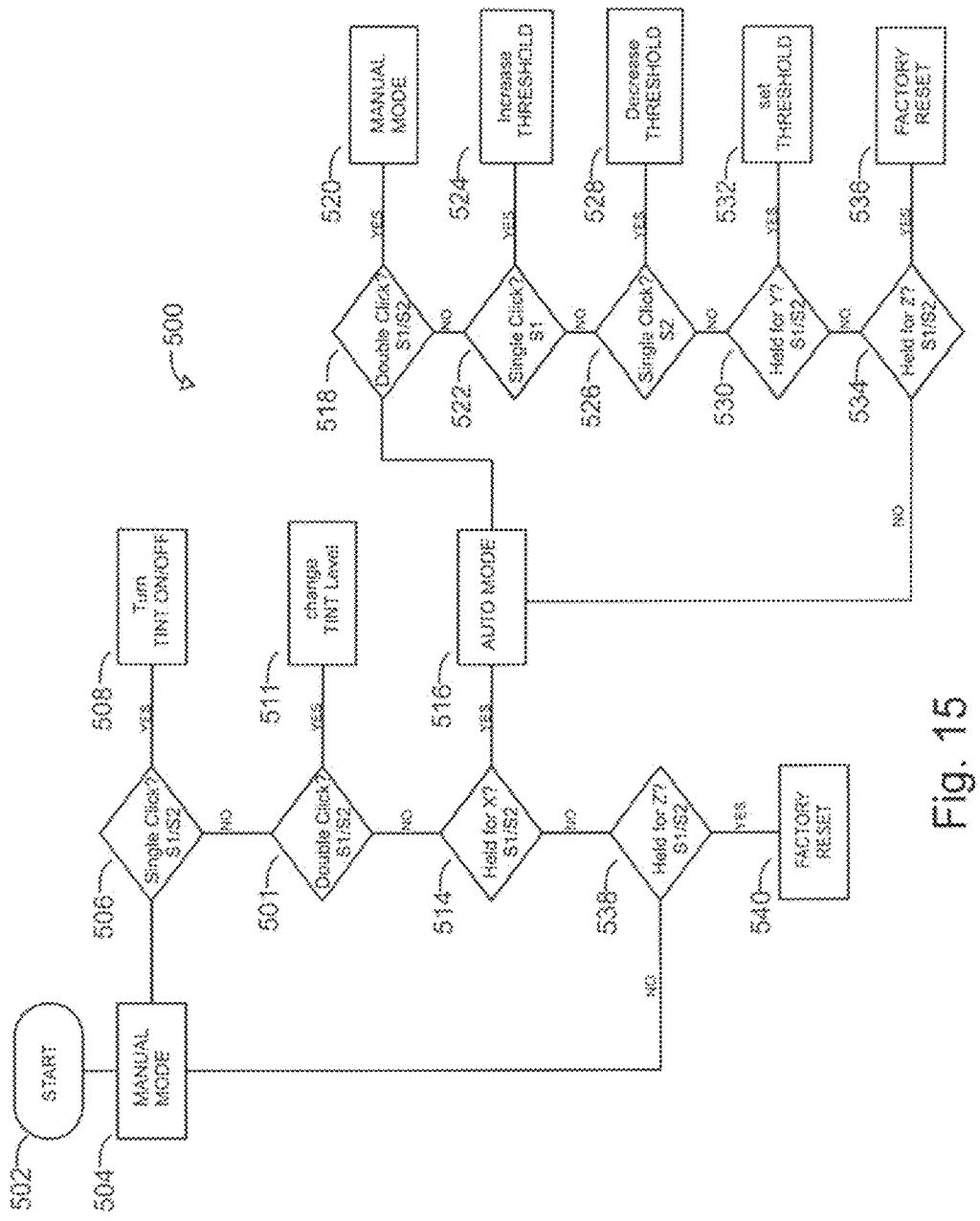
FIG. 15 is an operational flowchart of an alternative embodiment, showing alternative steps, including a tint change operation and a manual threshold change.

Referring now to FIG. 15, an alternative embodiment of the operational method of the MCA utilized by the control circuit 48 is designated generally by the numeral 500. In this embodiment, when the eyewear is first turned on 502, it is in manual mode 504. If a single click 506 of switch 1 (S1) or switch 2 (S2) is detected, then a signal is generated by the microcontroller 64 to change the state or turn the cell/sub-cells(s) On or Off 508. In other words, if the cell is On, a single click of the switch will change the cell to a clear state or in the alternative, if the cell is in a clear state, a single click will change it to an On or tinted state. If a single click is not detected but a double click of either switch is detected 510, the tint level of the on/tinted cell is changed via operational steps 511 in the same manner as step 311 shown in FIG. 11 and outlined in EXAMPLE 3. Once the tint level is set, that selected tint level will be the default setting for all modes.

However, if a double click is not detected but either switch is pressed and held for about X seconds 514, for example 2 seconds or other predetermined period of time, then the control circuit 48 enters the Auto mode 516.

In the Auto mode, actuation using a single click 518 reverts the device into manual mode 520. In this particular configuration, when the device is in the Auto mode, the photosensor detects the ambient light level and changes the state of the cell or sub-cell accordingly. In other words, the Auto mode can be disengaged by a single click button actuation, where power is no longer provided to the cell, resulting in a clear state of the cell and a return to the manual mode at step 520.

In the Auto mode, a single click of S1 522 causes a manual increase in the threshold value 524 while a single click of S2 526 causes a decrease in the threshold value 528 of the cell/sub-cell. This feature is useful, for example, for someone who is moving fast in a car or on a motorcycle or bicycle, etc. Accordingly, if in an Auto mode, the eyewear is not darkening in response to the ambient light conditions and the user desires the cell to tint in such conditions, but the user does not have time to go through the Automatic Threshold Adjustment Sequence 530, 352, the user can adjust the threshold manually using the Manual Threshold Adjustment Sequence described in steps 522, 524 and 526, 528. The manual sequence may be preferred rather than a more complicated press and hold sequence while traveling at a high speed.

The device may still have an Automatic Threshold Adjustment Sequence 530, 352 as follows: after the device enters the automatic mode at 516, if either S1 or S2 is pressed and held for about Y seconds (530), then the threshold value for triggering automatic application of voltage is set according to the surrounding ambient light level (step 532).

If while either in the manual mode or Auto mode, either S1 or S2 is pressed and held for about Z seconds, 538 and 534, a factory reset procedure is implemented (steps 540 and 536, respectively).

Example 6

In this example, switches 32 and 33 are in communication with the electronics such that the microcontroller 64 can differentiate an actuation of switch 32 from an actuation of switch 33. In this way, additional features can be added to the eyewear device. This example highlights the ability of the device to increase or decrease the tint/transmission level of the cell (when On) by using one switch to increase and the other switch to decrease transmission level.

Figure 16:
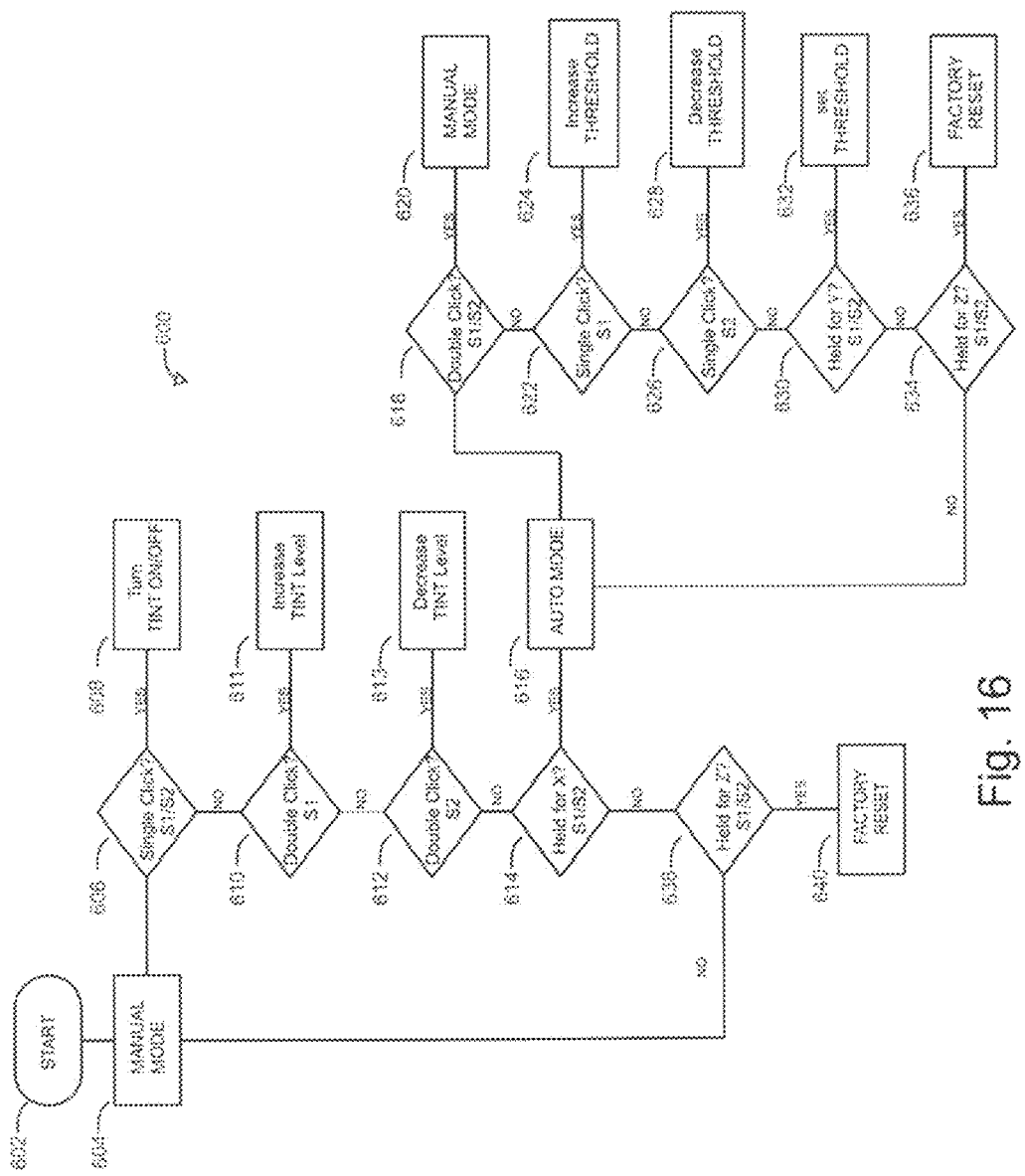
FIG. 16 is an operational flowchart of an alternative embodiment, showing alternative steps, including an increase and decrease of tint level utilizing a two switch system.

Referring now to FIG. 16, an alternative embodiment of the operational method of the MCA utilized by the control circuit 48 is designated generally by the numeral 600. In this embodiment, the process starts at step 602 where the device is in manual mode 604. If a single click of either switch S1 or S2 is detected 606 then a signal is generated by the microcontroller to turn the cell/sub-cells(s) On or Off 608. If at step 606 a single click is not detected but a double click of S1 is detected 610, the tint level of the ON/tinted cell is increased 611, i.e. the voltage is increased to the next voltage level or to Vmax and the transmission of the device is decreased. If a double click of S2 is detected 612, the tint level of the ON/tinted cell is decreased 613, i.e. the voltage applied is decreased to Vn. Once through the operation of S1 or S2 the tint level is set, that tint level will become the default setting for future On/Off and Auto modes. In some instances, there can be multiple intermediate voltages and corresponding intermediate transmission levels.

If either S1 or S2 is pressed and held for about X seconds 614, for example 2 seconds or other predetermined period of time, then the control circuit enters the Auto mode 616.

In the Auto mode, a double click of either S1 or S2 (step 618) causes return to the manual mode 620 and/or a drop in the applied voltage to 0 (V0). Thus, a double click when the cell is in Auto mode and On will cause the cell to go clear (safety feature) and return the cell to Manual mode. A double click when the cell is clear and in Auto will simply return the cell to Manual mode 620.

The Auto mode can function in a similar manner as described in EXAMPLE 5 with respect to switch 1 and 2 increasing or decreasing the threshold.

If either switch is pressed and held for about Z seconds while the device is in Auto mode (634) or in Manual mode (638), factory reset procedure is implemented at steps 636 and 640, respectively.

Example 7

In this example the device cell is composed of two sub-cells and the switches S1 and S2 are in communication with the electronics such that the microcontroller can differentiate between actuation of S1 and actuation of S2. In this way, additional features can be added to the eyewear device. This example highlights the ability of the device to increase or decrease the tint/transmission level of one or more sub-cells when in the ON state by using S1 and S2 to increase and decrease transmission of each sub-cell. In this example, the sub-cells contain different colored mixtures, i.e. one sub-cell is color 1 (e.g. blue) and the other sub-cell is color 2 (e.g. orange) when each are in the tinted state. When both sub-cells are in a tinted state, the lens color (color 1+color 2) is color 3 (e.g. a neutral or grey color). It is understood that the sub-cells could have the same color, or have different electro-optic materials. A "lens" refers to the combination of the stacked sub-cells and will have the color of whichever one or more sub-cells is in the On or tinted state.

Figure 17:
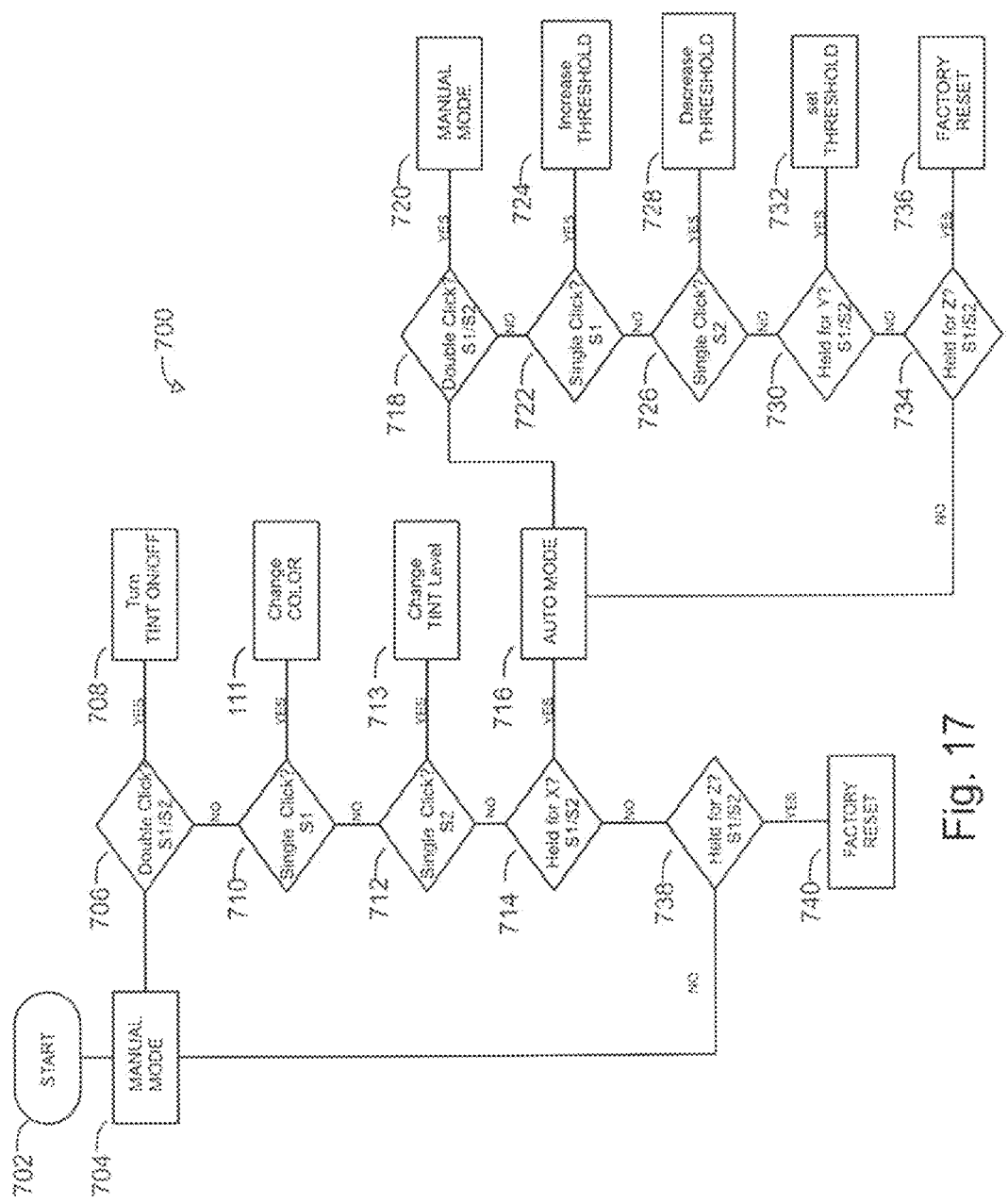
FIG. 17 is an operational flowchart of an alternative embodiment, showing alternative steps, including a color change.
Figure 18:
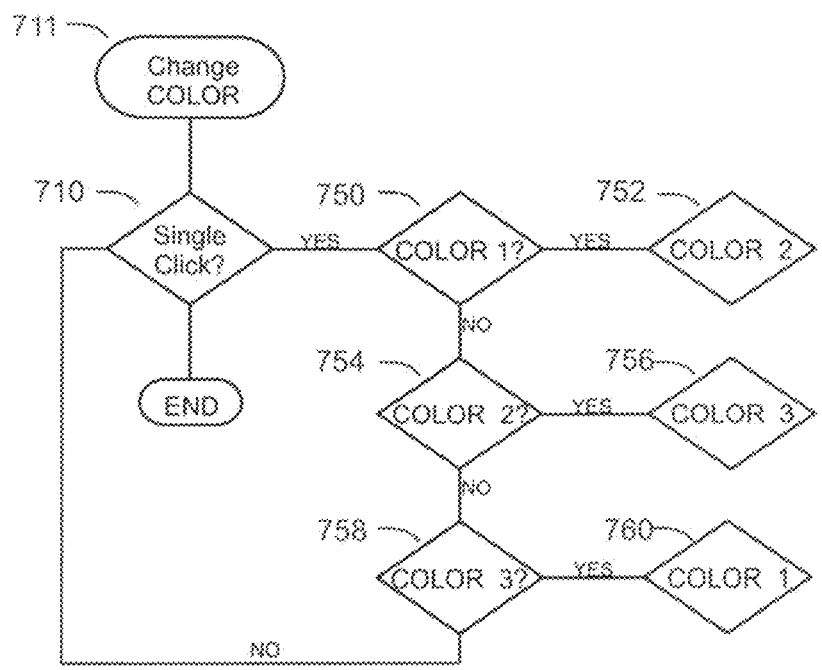
FIG. 18 is an operational flowchart showing a color change operation.

Referring now to FIG. 17, an alternative embodiment of the operational method of the MCA utilized by the control circuit is designated generally by the numeral 700. In this embodiment, the process starts at step 702 when the device is in the manual mode 704. A double click of S1 or S2 706 will affect an On/Off function by changing both sub-cells On or Off 708. A single click of S1 (710) will toggle through applying voltage to each sub-cell so as to change the color of the lens (711). This function is further illustrated in FIG. 18. Essentially single clicks of S1 enables toggling/cycling though the various color options. In this example color 1 is achieved by having only sub-cell 1 in the tinted state, color 2 is achieved by having only sub-cell 2 tinted state, and color 3 is achieved by having both sub cell 1 and sub cell 2 in the tinted state. By actuating S1 with a single click 710, the lens color can be selected by toggling through the colors (FIG. 18) such that if the lens is in color 1 (750), then it will go to color 2 752; if the lens is in color 2 (754) then it will go to color 3 (756); and if the lens is in color 3 (758), it will go to color 1 (760). The user can thus select the desired color for future Manual or Auto modes by setting the desired color as the default color for the On state in all modes.

Figure 19:
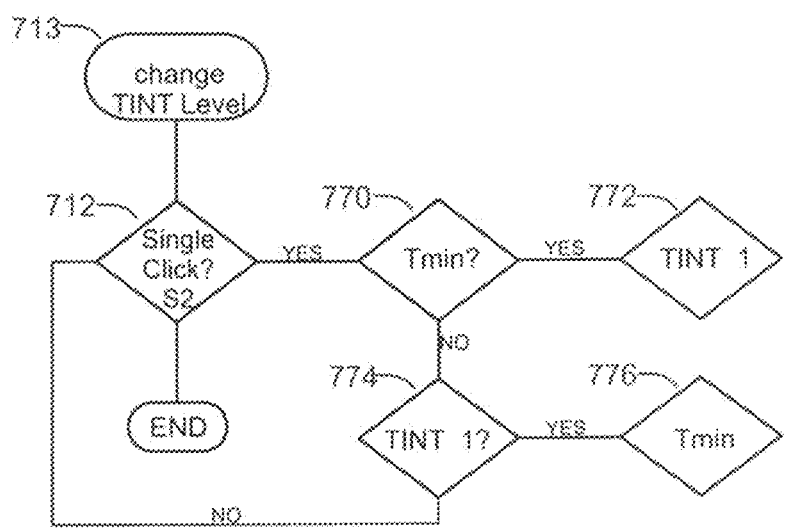
FIG. 19 is an operational flowchart showing a "change tint level" operation.

Referring back to FIG. 17, a single click of S2 712 affects a tint change 713. Operational step 713 is further illustrated in FIG. 19. Tmin is the transmission level of the lens when Vmax is applied to the selected sub-cell (having the default color). Tint 1 is the transmission level of the lens when V1 is applied to the selected sub-cell, affecting an intermediate Transmission level (T1) for that default color state of the device. If the default tint level is Tmin, 770, then a single click of S2 selects Tint 1 (772). If the default tint level is Tint 1, 774, then a single click of S2 selects Tmin as the default tint (776). Additional intermediate transmissions (T1,2, 3, . . . ) can be achieved by applying voltages (V1,2, 3, . . . ) and can be cycled or toggled in the manner described above.

Referring back to FIG. 17, additional functions include:
- pressing and holding S1 or S2 for about X seconds (714) to enter the Auto mode 716;
- double click of either S1 or S2 (718) to return to the Manual mode 720;
- while in the Auto mode, a single click of S1 (722) to achieve an increase in the threshold value (724), and a single click of S2 (726) to achieve a decrease in the threshold value (728) (Manual Threshold Adjustment Sequence);
- a press and hold for about Y seconds (730) to set the threshold value according to a selected ambient light (732);
- a press and hold for about Z seconds (738 and 734) to affect factory reset.

Example 8

Figure 21:
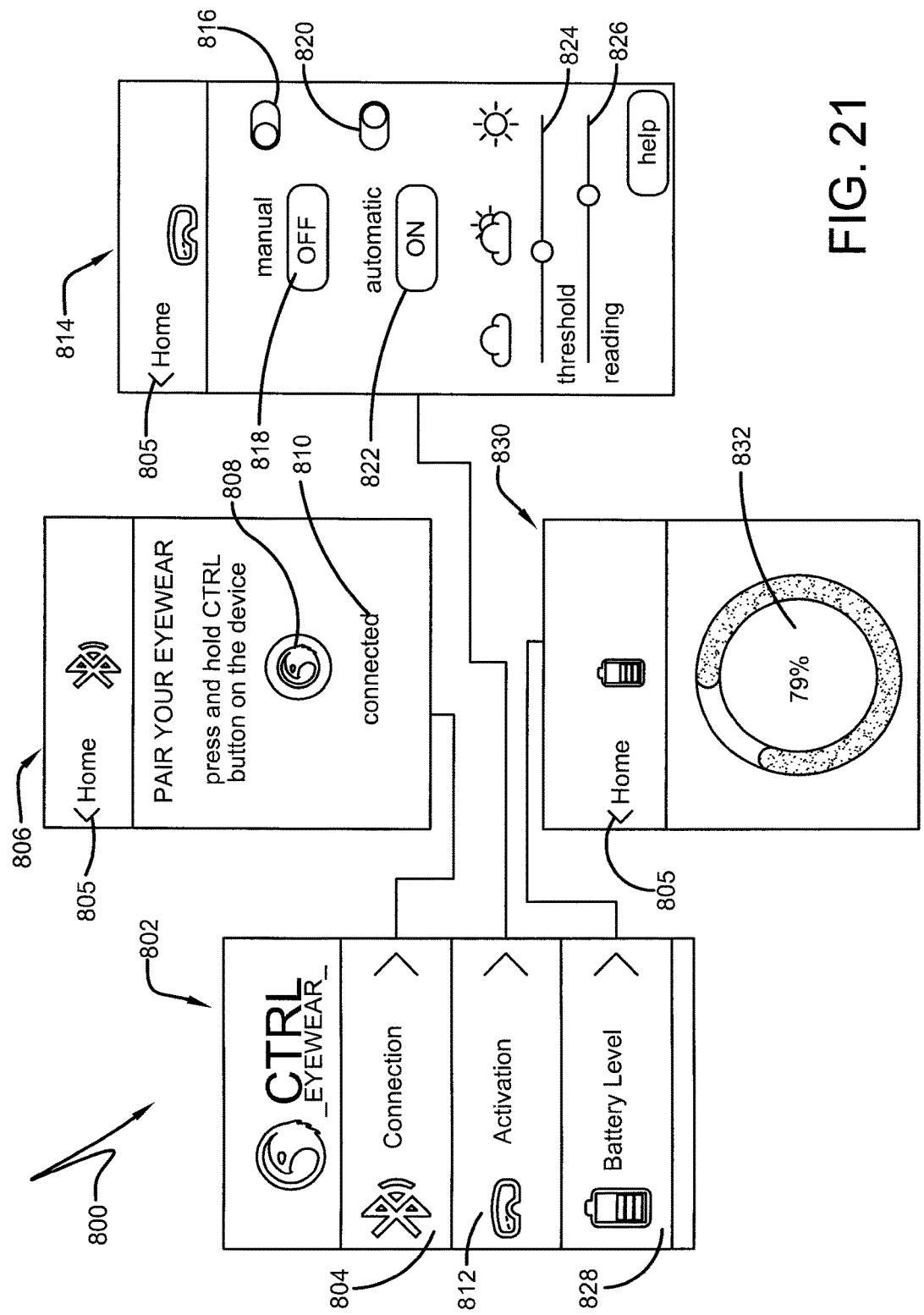
FIG. 21 is a schematic representation of a smart interface integrated into a remote switch.

This example shows an example of a wireless remote switch programmed to be connected to and to affect functions within the optical device through user commands. (FIG. 21)

The eyewear has a microcontroller (not shown) that is integrated into a Bluetooth module, although it is understood that the microcontroller may be positioned elsewhere. The Bluetooth module allows for connection to a Bluetooth-enabled smart device such as a smart phone. The eyewear's microcontroller or control circuit is also programmed to receive remote signals from the remote switch, and to produce one or more appropriate instructions to carry out one or more user commands communicated through the remote signals.

The smart device has an associated software program for the purpose of providing a graphical interface that has a predetermined set of labeled buttons corresponding to the user commands, selection of each labeled button generating the appropriate remote signal.

The eyewear itself still maintains a switch that is attached or carried on the eyewear device. While the eyewear and its attached switch can function in a similar manner to any of the previous examples described, the remote switch can duplicate some of the same functions as the attached switch on the device, or can add additional functions or user commands.

Some examples of the operational features of the remote switch are shown in FIG. 21. The operational features of the remote switch software utilized by the control circuit is designated generally by the numeral 800. The user will select the eyewear application on the smart device, which in turn will load the home screen 802. The user then selects the connection feature 804 at which the screen advances to the "Connection" interface 806. The user presses the on-screen button 808 to establish a connection between the eyewear and the smart device. Indicator 810 will display the connection status, i.e. whether the device is connected or not (here, numeral 810 indicates a connected device).

Once a connection is established between the eyewear and remote switch, the user returns to the home screen 802 by pressing the "home" indicator 805. The user may then select the Activation feature 812 at which the screen advances to the "Activation" interface 814. In the Activation interface, the user can decide whether to enter a manual mode or automatic mode. The user selects manual mode by activating the manual on-screen sliding switch 816. Here, the on-screen sliding switch 816 is shown in the left/Off position. The user selects the manual mode by swiping switch 816 from left to right. "Swiping" refers to an act or instance of moving one's finger across a touch screen to activate a function. The user is then able to press on-screen button 818 to change the cell from an OFF/clear state of high transmission to an ON/tinted state of lower transmission and vice versa (manually).

The user may enter the automatic mode by swiping the automatic on-screen sliding switch 820 from left to right. Here, the automatic on screen sliding switch 820 is shown in the ON position. The user may then enter the device into the automatic mode by pressing the automatic on screen button 822. Once in automatic mode, the microcontroller compares the ambient light threshold value to the measured value obtained from the light sensor. Accordingly, when in the auto mode, if the threshold value is lower than the reading/measured value from the light sensor, the device will automatically apply a voltage to switch the cell from the clear state to the tinted state. When the measured ambient light level from the environment is below the threshold value, voltage is dropped to 0 so that the cell returns to the clear state (note, if the cell was already in the clear state, it will remain in the clear state with no voltage applied).

While the eyewear is in the automatic mode, the user may adjust the automatic mode features, such as the threshold value for automatic application of voltage using the on-screen threshold slide button 824. Sliding to the right increases the threshold value (i.e. voltage will be applied to the cell when outside light levels are higher), while sliding to the left decreases the threshold value (i.e. cell will be automatically darkened at lower outside light levels). The user is presented with the current reading of the light sensor 826 such that the user can determine where the threshold value should be based on the ambient light conditions. The user may return to the home screen 802 by pressing the "home" button 805.

From the home screen 802, the user may select the battery level feature 828 by pressing the screen in the "Battery Level" area 828. The screen then advances to show the Battery Level interface 830. The smart device displays the charge status of the battery in terms of the percentage of battery life remaining 832 (or in any other terms known in the art). For the battery level, a percentage could be used (as pictured) but also lifetime remaining, or simple battery bar indicators can also be used.

The user may return to the home screen 802 by pressing the home button 805.

It should be noted that the above example is only one of many examples of how the remote switch, as implemented on a smart device, may be programmed to perform various functions relating to the eyewear. People of skill in the art will appreciate other functional features that may be added to the remote switch, such as enabling a tint level change (up or down depending on personal preference), or a color selection, or any combination of the functions described in this application, or generally available to a user of an electronic eyewear as described herein, and in any combination with an attached switch on the device. Some examples of functions in a multi-cell (a cell having two or more sub-cells) that can be implemented remotely include:

- selecting which sub-cell is activated (blue, orange, neutral, etc.);
- selecting a transmission level for each sub-cell in the On state (e.g. the shade of the color), for example: blue cell at T1-V1 while Orange cell at Tmin-Vmax, so the lens would have a neutral color with an orange bias;
- Selecting a separate threshold value for each color setting when the device is in the auto mode.

Other functions or display modes that can be implemented on the remote switch include, for example, displaying the user's UV exposure or the amount of time the eyewear is in the ON state (e.g. this could continuously add up hours like a car odometer tracks miles and could be reset). The remote switch can have an option for setting delays, i.e. set how quickly the eyewear changes when in auto mode, such as a delay time of X seconds so the eyewear becomes tinted X seconds after the light threshold is met, or goes clear with a delay of X seconds after ambient light drops below the light threshold.

Other user commands include a "fade" function, such that for example when walking from outside to inside, the voltage applied is increased in a stepwise manner, making transition from clear to tinted a smooth transition rather than a quick on/off).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

The invention claimed is:

1. An electronically controllable eyewear device, comprising:
   a cell comprising at least one liquid crystal material able to change between a first state of maximum light transmittance ($T_{max}$) when no voltage ($V_0$) is applied and a second state of minimum light transmittance ($T_{min}$) when a maximum voltage ($V_{max}$) is applied, wherein the cell can be operated in an auto or a manual mode;
   a photosensor electronically connected to the cell for generating a light input signal based on an ambient light level to trigger an automatic application of voltage when the device is in the auto mode, wherein detection of an ambient light level above a threshold value triggers the automatic application of voltage to the cell and wherein detection of an ambient light level below the threshold value results in no voltage being applied;
   a first and a second switch, each capable of being actuated in a series of actuation sequences each to select a distinct function; and
   a control circuit responsive to each said actuation sequence and said light input signal to operate the cell in a corresponding one of a plurality of functions;
   wherein the actuation sequences comprise:
   (i) a first actuation sequence for affecting an ON/OFF function such that when OFF, no voltage is applied to the cell and when ON, a voltage is applied to the cell;
   (ii) a second actuation sequence for affecting a system change from the manual mode to the auto mode; and
   (iii) a third actuation sequence for changing the threshold value for triggering the automatic application of voltage.

2. The device according to claim 1, wherein actuating the first or second switch using the third actuation sequence when the device is in the auto mode and in a selected ambient light condition changes the threshold value for triggering the automatic application of voltage to said selected ambient light condition.

3. The device according to claim 1, wherein if the threshold value for triggering the automatic application of voltage has been changed, actuating the first or second switch in a fourth actuation sequence affects a factory re-set to original factory settings.

4. The device according to claim 1, wherein a further actuation sequence affects a manual increase or decrease in the threshold value for triggering the automatic application of voltage.

5. The device according to claim 1, wherein when the device is in the auto mode, actuating the first or second switch using the first actuation sequence returns the device from the auto mode to the manual mode.

6. The device according to claim 1, wherein the actuations sequence affecting functions (i), (ii) and (iii) are the same for the first and the second switch.

7. The device according to claim 1, wherein the liquid crystal material is further able to change to one or more intermediate states having one or more intermediate light transmittance ($T_n$) between $T_{max}$ and $T_{min}$ when one or more intermediate voltages ($V_n$) are applied,
   wherein actuation of the first or second switch, or both, in a new sequence toggles the applied voltage between one or more intermediate voltages ($V_n$) and said maximum voltage ($V_{max}$) to alter the level of light transmission of the device.

8. The device according to claim 1, wherein the cell comprises at least two stacked sub-cells,
    each sub-cell comprising at least one liquid crystal material able to change between the first $T_{max}$ state and the second $T_{min}$ state;
    wherein actuation of the first or the second switch, or both, using said series of actuation sequences selects a function for each said sub-cell.

9. The device according to claim 8, wherein the cell comprises two sub-cells and wherein the first switch operates one or more functions in one sub-cell and the second switch operates one or more functions in the other sub-cell.

10. The device according to claim 8, wherein the cell comprises two sub-cells, and wherein actuating the first or second switch in the first actuation sequence operates to turn each said sub-cell OFF or ON, thereby toggling the device between four states where: (i) both said sub-cells are Off, (ii) one said sub-cell is On, (iii) the other said sub-cell is On, and (iv) both said sub-cells are On.

11. The device according to claim 1, wherein the device comprises a first and a second temple, wherein the first switch is located on the first temple and the second switch is located on the second temple.

12. The device according to claim 1, wherein one of said first or second switches is a remote switch.

13. An electronically controllable eyewear device, comprising:
    a cell comprising at least one liquid crystal material able to change between a first state having maximum light transmittance ($T_{max}$) when no voltage ($V_0$) is applied, a second state having minimum light transmittance ($T_{min}$) when a maximum voltage ($V_{max}$) is applied, and one or more intermediate states having intermediate light transmittance ($T_{min}$) between $T_{max}$ and $T_{min}$ when one or more intermediate voltages ($V_n$) are applied, wherein the cell can be operated in an auto or a manual mode;
    a photosensor electronically connected to the cell for generating a light input signal based on an ambient light level to trigger an automatic application of voltage when the device is in the auto mode, wherein detection of an ambient light level above a threshold value triggers the automatic application of voltage to the cell and wherein detection of an ambient light level below the threshold value results in no voltage being applied;
    a switch capable of being actuated in a series of actuation sequences each to select a distinct function; and
    a control circuit responsive to each said actuation sequence and said light input signal to operate the cell in a corresponding one of a plurality of functions;
    wherein the actuation sequences comprise:
    (i) a first actuation sequence for affecting an ON/OFF function such that when OFF, no voltage is applied to the cell and when ON, a voltage is applied to the cell; and
    (ii) a second actuation sequence for affecting a system change from the manual mode to the auto mode.

14. The device according to claim 13, wherein actuating the switch in a third actuation sequence when the device is in the auto mode changes the threshold value for triggering the automatic application of voltage.

15. The device according to claim 13, wherein a further actuation sequence affects a manual increase or decrease in the threshold value for triggering the automatic application of voltage.

16. The device according to claim 13, wherein the device comprises a second switch.

17. The device according to claim 16, wherein the second switch is a remote switch.

18. The device according to claim 16, wherein actuating the first switch in a tint sequence increases the voltage being applied to the cell and actuating the second switch in a tint sequence decreases the voltage being applied to the cell, or vice versa.

19. The device according to claim 13, wherein the cell comprises at least two stacked sub-cells,
    each sub-cell comprising at least one liquid crystal material able to change between a first state of maximum light transmittance ($T_{max}$) when no voltage ($V_0$) is applied, a second state of minimum light transmittance ($T_{min}$) when a maximum voltage ($V_{max}$) is applied, and one or more intermediate states having intermediate light transmittance ($T_n$) between said $T_{max}$ and said $T_{min}$ when one or more intermediate voltages ($V_n$) are applied;
    wherein actuation of the switch in each said series of actuation sequences selects a distinct function for each said sub-cell.

20. The device according to claim 19, wherein actuating the switch in the first actuation sequence operates such that when OFF, no voltage is applied to either said sub-cell and when ON, a voltage is applied to one or more sub-cells.

21. The device according to claim 19, wherein the actuation sequences further comprise:
    (iii) an actuation sequence for changing the threshold value for each said sub-cell when the sub-cell is in the auto mode.

22. The device according to claim 19, wherein the control circuit is capable of toggling the applied voltage to each said sub-cell between said one or more intermediate voltages ($V_n$) and said maximum voltage to alter the level of light transmission of the sub-cell.

23. The device according to claim 19, wherein the device comprises a second switch.

24. The device according to claim 23, wherein the second switch is remote.

25. An electronically controllable eyewear device, comprising:
    a cell comprising at least one liquid crystal material able to change between a first state of maximum light transmittance ($T_{max}$) when no voltage ($V_0$) is applied and a second state of minimum light transmittance ($T_{min}$) when a maximum voltage ($V_{max}$) is applied, wherein the cell can be operated in an auto or a manual mode;
    a photosensor electronically connected to the cell for generating a light input signal based on an ambient light level to trigger an automatic application of voltage when the device is in the auto mode, wherein detection of an ambient light level above a threshold value triggers the automatic application of voltage to the cell and wherein detection of an ambient light level below the threshold value results in no voltage being applied;
    a switch attached to said device capable of being actuated in a series of actuation sequences each to select a distinct function;

a remote switch coupled to said device and capable of producing one or more remote signals to enable one or more user commands;

a control circuit responsive to each said actuation sequence and light input signal to operate the cell in a corresponding one of a plurality of functions comprising;

(i) an ON/OFF function such that when OFF, no voltage is applied to the cell and when ON, a voltage is applied to the cell; and (ii) a system change from the manual mode to the auto mode;

and wherein the control circuit is further programmed to receive each said remote signal and produce appropriate instructions to carry out the one or more user commands.

26. The device according to claim 25, wherein the remote switch communicates with the eyewear device through a wireless connection.

27. The device according to claim 25, wherein the remote switch is integrated into a smart device.

28. The device according, to claim 27, wherein the smart device comprises a software application having a graphical interface with a predetermined set of labeled buttons corresponding to the one or more user commands, wherein selection of each said labeled button generates the appropriate remote signal.

29. The device according to claim 25, wherein the user commands comprise one or more of the following:

(a) an ON/OFF function such that when OFF, no voltage is applied to the cell and when ON, a voltage is applied to the cell;

(b) a system change from the manual mode to the auto mode;

(c) a threshold adjustment function for adjusting the threshold value for triggering the automatic application of voltage.

30. The device according to claim 25, wherein the liquid crystal material is further able to change to one or more intermediate states having one or more intermediate light transmittance ($T_n$) between $T_{max}$ and $T_{min}$ when one or more intermediate voltages ($V_n$) are applied;

wherein the remote switch is capable of enabling a user command to select one or more intermediate voltages $V_n$ to be applied to the cell to alter the level of light transmission of the device.

31. The device according to claim 25, wherein the cell comprises at least two stacked sub-cells, each sub-cell comprising at least one liquid crystal material able to change between a first state of maximum light transmittance ($T_{max}$) when no voltage ($V_0$) is applied, a second state of minimum light transmittance ($T_{min}$) when a maximum voltage ($V_{max}$) is applied;

wherein the remote switch is capable of producing one or more remote signals to enable one or more user commands for each said sub-cell; and wherein the control circuit is programmed to receive and process the remote signals for each said sub-cell and produce appropriate instructions to carry out the user command for each said sub-cell.

* * * * *

UNITED STATES PATENT AND TRADEMARK OFFICE
CERTIFICATE OF CORRECTION

PATENT NO. : 10,095,052 B2
APPLICATION NO. : 15/230641
DATED : October 9, 2018
INVENTOR(S) : Bhatta et al.

It is certified that error appears in the above-identified patent and that said Letters Patent is hereby corrected as shown below:

In the Claims

In Column 27, Line 37 (Claim 13, Line 9) the word "($T_{min}$)" should read --($T_n$)--.

Signed and Sealed this
Twenty-second Day of January, 2019

Andrei Iancu
*Director of the United States Patent and Trademark Office*